United States Patent [19]

Bolyard et al.

[11] Patent Number: 4,913,357
[45] Date of Patent: Apr. 3, 1990

[54] AUTOMATIC WASHING APPARATUS

[75] Inventors: Kenneth D. Bolyard; Leroy W. Rucks, both of Paris, Tex.; Ronald E. Abbott, R.R. 6, Box 436, 3715 Lamar Ave.; L. Ray Spencer, Rt. 1, Box 781, 3715 Lamar Ave., both of Paris, Tex. 75460

[73] Assignees: Ronald E. Abbott; L. Ray Spencer, both of Paris, Tex.

[21] Appl. No.: 277,307

[22] Filed: Nov. 29, 1988

Related U.S. Application Data

[63] Continuation-in-part of Ser. No. 143,659, Jan. 13, 1988, abandoned, which is a continuation of Ser. No. 27,531, Mar. 18, 1987, abandoned.

[51] Int. Cl.[4] .............................................. B60S 3/04
[52] U.S. Cl. ................................. 239/751; 239/752; 134/123; 134/172; 74/109
[58] Field of Search ............... 239/743, 744, 750, 751, 239/752; 134/123, 172; 15/DIG. 2; 74/32, 109, 422

[56] References Cited

U.S. PATENT DOCUMENTS

| | | | |
|---|---|---|---|
| 2,839,970 | 6/1958 | Gaffney | 92/31 |
| 2,896,857 | 7/1959 | Tompkins | 239/185 |
| 3,072,130 | 1/1963 | Grabenhorst | 134/99 |
| 3,299,901 | 1/1967 | Axe et al. | 134/123 |
| 3,422,827 | 1/1969 | McCulloch | 134/123 |
| 3,443,993 | 5/1969 | Lynn et al. | 134/123 |
| 3,529,611 | 9/1970 | Daum et al. | 134/112 |
| 3,543,774 | 12/1970 | Trasp | 134/57 |
| 3,645,282 | 2/1972 | Kurronen | 134/45 |
| 4,256,511 | 3/1981 | Atchison et al. | 134/46 |
| 4,456,177 | 6/1984 | Johnson | 239/209 |
| 4,466,572 | 8/1984 | Shelton | 239/186 |
| 4,553,558 | 11/1985 | Hamazaki et al. | 134/181 |
| 4,587,688 | 5/1986 | Gougoulas | 15/316 R |

FOREIGN PATENT DOCUMENTS 841966 7/1960 United Kingdom ................. 134/123

*Primary Examiner*—Andres Kashinkow
*Assistant Examiner*—Karen B. Merritt
*Attorney, Agent, or Firm*—Hubbard, Thurman, Turner, Tucker & Harris

[57] ABSTRACT

An automatic washing apparatus designed to travel on a single I beam track that can be easily mounted in an existing self-service car wash bay. This apparatus is unique within itself since the trolley apparatus that supplies water and chemicals to the water boom manifold is driven entirely by a screw gear apparatus. The water boom manifold swing is also unique, being rotated by a single half spur gear that is rotated by striking a gear rack at either end of the I beam. An improved embodiment features an adjustable gear rack assembly at one end of the track which is adjusted to shorten the linear travel between end turns in response to signals from vehicle position indicating devices in order to efficiently wash smaller cars. The improved embodiment also includes a smoother vibrationless screw drive and a more rigid one-way clutch bearing support for the rotating members.

34 Claims, 16 Drawing Sheets

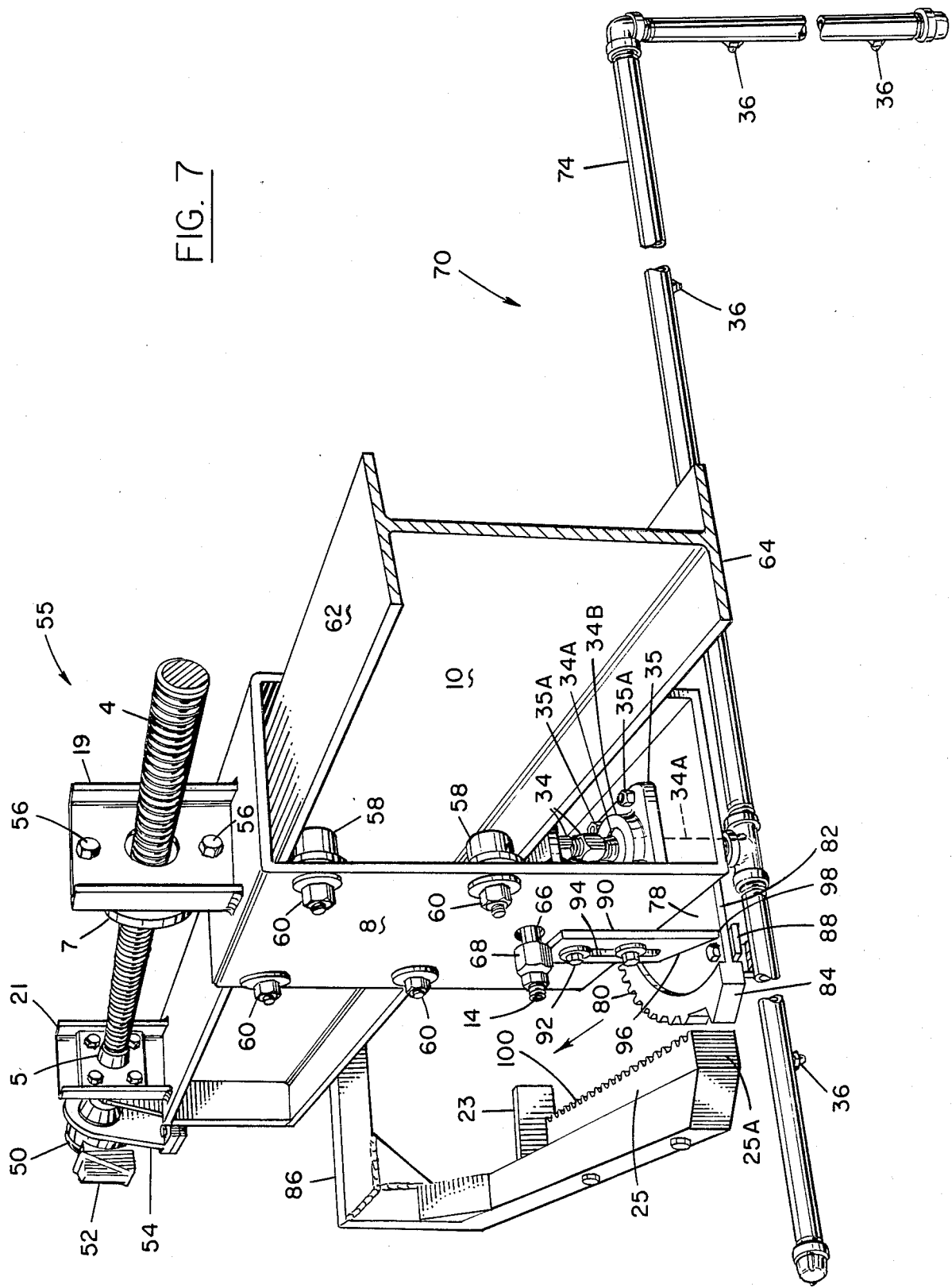

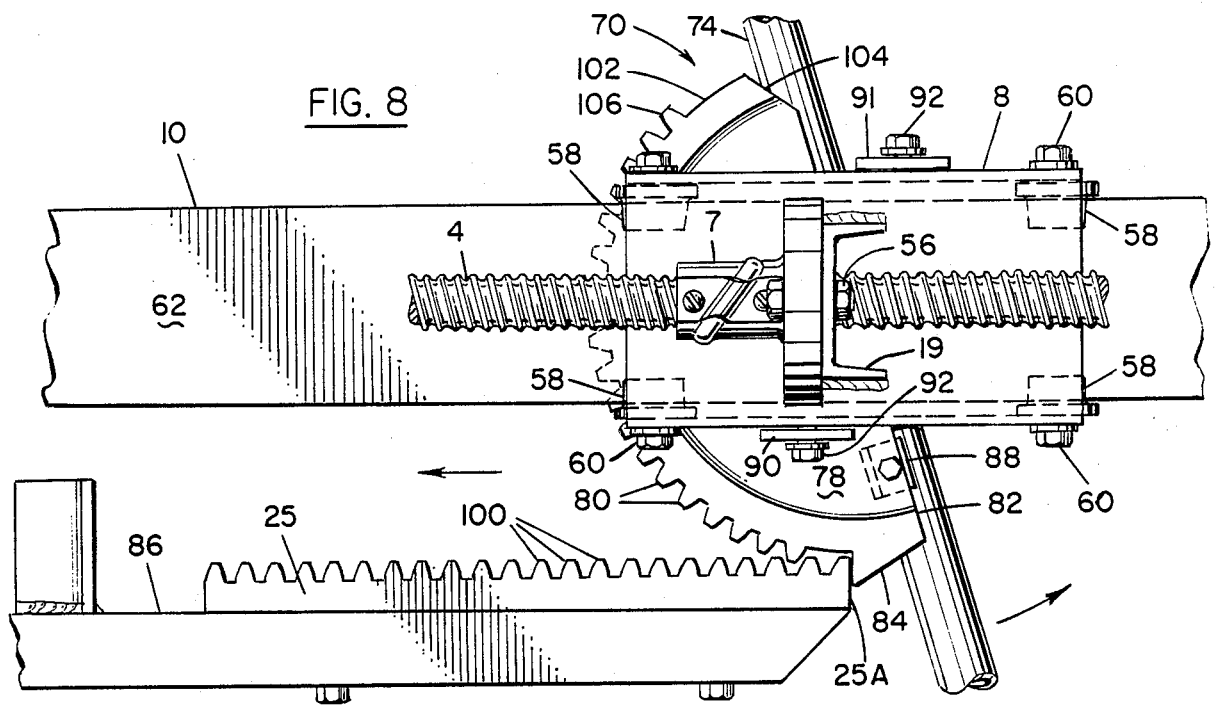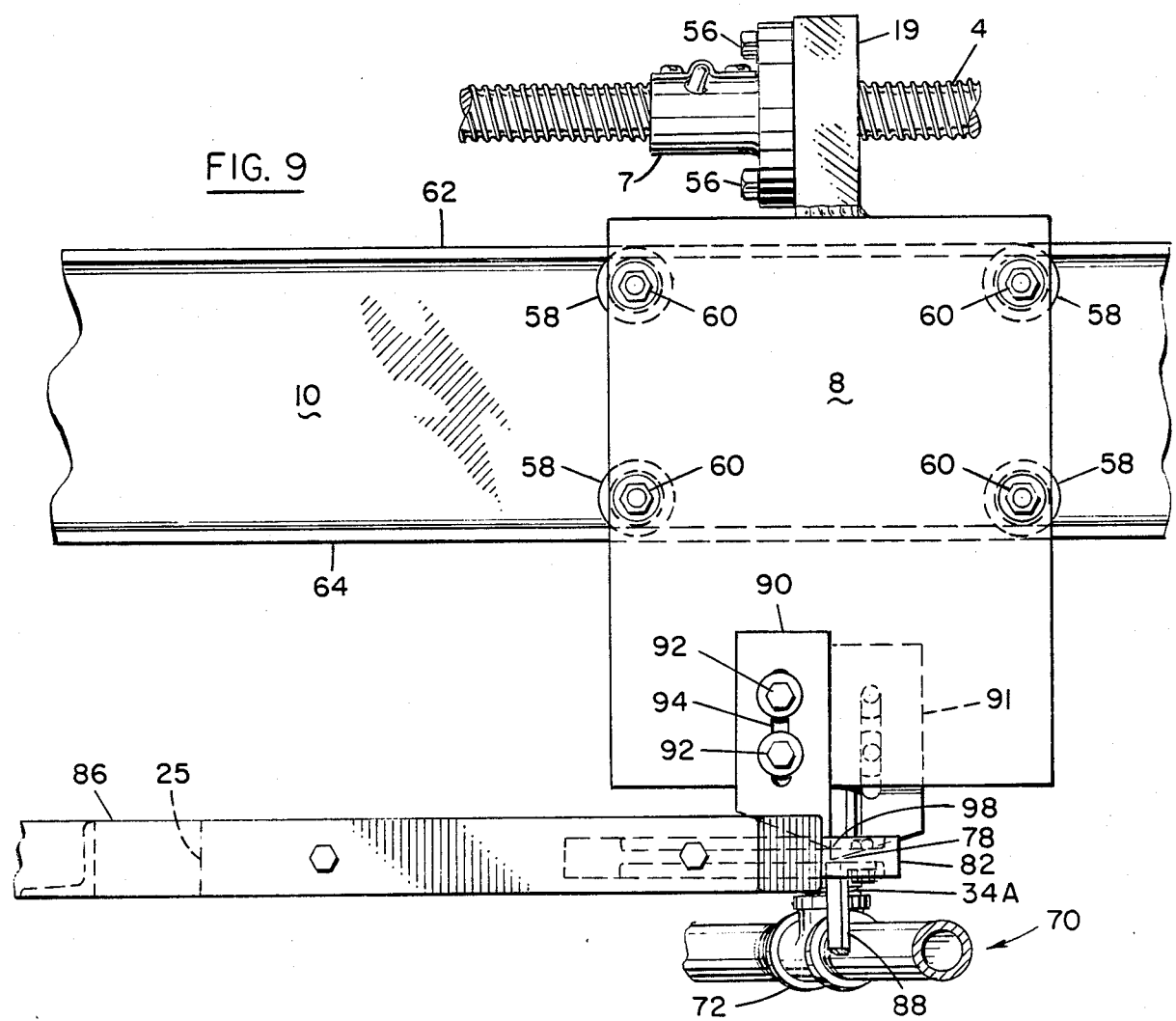

AUTOMATIC WASHING APPARATUS

CROSS-REFERENCE TO RELATED APPLICATIONS

This application is a continuation-in-part of U.S. patent application Ser. No. 143,659, filed Jan. 13, 1988, now abandoned, which in turn is a continuation of U.S. patent application Ser. No. 07/027,531, filed Mar. 18, 1987, now abandoned, including the same inventors, Kenneth Dale Bolyard and Leroy Wilson Rucks, incorporated herein by reference. Benefit of filing dates under 35 U.S.C. §120 is claimed for the inventions disclosed in the earlier applications.

FIELD OF THE INVENTION

The field of this invention is a system for automatically washing the outer surfaces of an automobile, truck, van or the like, by moving and spraying chemicals, waxes and water both hot and cold on a vehicle to remove dirt, grease and any other foreign materials from its exterior.

DESCRIPTION OF THE PRIOR ART

Having been directly involved for fifteen years with the construction, installation, and operations of both self-service and automatic car washes, we have noticed some exotic and extreme mechanical apparatuses being used in the area of washing cars; therefore causing difficult hardships on the owners in the areas of maintenance, operational cost and down time.

One problem is that most automatic car washes will not fit into an existing self-service car wash bay without a complete reconstruction job of the existing building, or worse yet an entire new building to house the new car wash. Even then, most automatic car washes require special, heavy structural supports to carry the heavy apparatus. Installation times can run into weeks.

Another problem with many car wash systems is the operating maintenance overhead Some of the problems are slippage in the tracking devices, thus getting the car wash boom out of time and causing damage to the vehicle Broken chains, belts, pulleys, timing gears, etc. are always a constant problem. Durability and easy maintenance in automatic car washes is an instrument that must be preserved.

Yet another problem is on the consumer end. Low cost operations means savings for the customer If repair bills are kept to a minimum, the savings are passed along to satisfied repeat customers, thus increasing the popularity of a vehicle wash.

SUMMARY OF THE INVENTION

The present invention provides a much improved automatic, washing apparatus that can be easily maintained, installed, and operated. It is designed on a single I beam track that can be easily suspended in an existing self-service car wash by simply bolting braces onto existing structural steel.

Once in place, after utilities have been connected to the apparatus in their proper places, the apparatus is then ready for use. The drive motor mounted to a gear box on the end of an I beam track, once activated, turns the screw gear, thus moving the trolley/boom apparatus down the I beam track to a designated point near the end. As the trolley boom apparatus nears the end of the I beam track, its spur gear becomes engaged with a gear rack mounted off the side of the I beam track. Once a 180 degree turn is accomplished, having moved the water boom arm manifold around the front of the vehicle, the spur gear becomes disengaged with the gear rack moving the trolley apparatus onto a mounted microswitch that reverses the drive motor, thus causing the trolley boom apparatus to travel the opposite direction down the I beam track. At this point, the boom arm is on the opposite side parallel with the vehicle.

The water pressure being supplied is coming into the pipe mounted on the trolley apparatus through a high pressure water swivel also mounted in the trolley apparatus, and into the boom arm manifold, supplying each spray nozzle with the amount of pressure and water volume satisfactory to wash a vehicle.

The automatic wash apparatus repeats the above procedures at the opposite end of the I beam track. After completing a wash and rinse cycle, the apparatus is then terminated with a conventional timer device.

In a modified embodiment (FIGS. 7–10), also known as a second embodiment, the trolley has been modified to ride on the flanges of the I beam without touching the central web, the spur gear is modified to have a built-in alignment tooth which assures engagement of the teeth in the rack gear which is mounted on a modified mounting bracket at the bottom of the I beam track. There is a modified gravity lock and a different shaped boom manifold.

A third embodiment is an improved device of the invention in many respects. It has a unique vibrationless screw and drive nut mounted above the I beam for driving the trolley back and forth. A much more rigid support mechanism and water coupling is mounted on the trolley which incorporates a supporting one-way clutch bearing that eliminates the high pressure support flange and bearing and the gravity locks The clutch bearing will allow rotation only in the counterclockwise direction, the rotating part of the clutch bearing being connected to and supporting a support member fixed to the spur gear which rotates fixed to the boom manifold, having only one water swivel connection at the extreme bottom of the water inlet pipe.

In addition the third embodiment specifically provides for one or more variations in the length of the longitudinal run between opposite end turns of the spray boom manifold so as to accommodate cars of different lengths. One of the rack gears and associated limit switches is mounted on a sliding plate attached to the I beam which is operated by a piston or a controlled motor driven screw gear which modifies the position of the rack gear and thus the location along the length of the I beam at which rotation of the boom manifold takes place. This action operates in response to a one or more sensing devices such as an electric eye or several electric eyes which can change position of the rack gear assembly and its associated limit switches closer to the rack gear assembly at the opposite end of the I beam so that, for example, a shorter vehicle can be washed with its front wheels and axle located at a fixed trundle at the exit end of the wash while the spray manifold rotates closer to the rear end of the vehicle at the entry end for improved spray wash action during the wash cycle. These modifications make for a more efficient, versatile, smooth and maintenance free operation.

An object to a screw gear driven apparatus is that it is virtually maintenance free, giving an amazing long life expectancy. Because it is all gear tracked, there is no slippage, causing the apparatus to become out of time, resulting in damage to a vehicle or causing excessive wearing on apparatus parts. The screw gear drive eliminates belts, pulleys, sprockets, chains, etc., leaving a smooth, quiet, efficient operation.

Another object to this apparatus is the fact that it only weighs a few hundred pounds so that it is easily installed in an existing car wash bay without having to reconstruct or add any additional support.

Yet another object is the simplicity of this washing apparatus' construction. It is constructed in the most basic sense as to eliminate any additional moving parts, as well as weight. The installation is far more compact, cost effective and economical to purchase, operate and maintain than previous washing assemblies.

Many other objects and advantages can be readily understood after further studying of the drawings and explanations provided herein.

BRIEF DESCRIPTION OF THE DRAWINGS

FIG. 7 is a perspective view of a slightly modified second embodiment of the invention showing the spur gear about to engage the rack gear.

FIG. 8 is a view looking down on the device of FIG. 7 just after the teeth of the spur and rack gears have engaged.

FIG. 9 is a side profile elevation of FIG. 8.

DESCRIPTION OF THE PREFERRED EMBODIMENTS

In the description that follows, the same reference numbers will be used on like parts in the various drawing figures.

Figure 1:
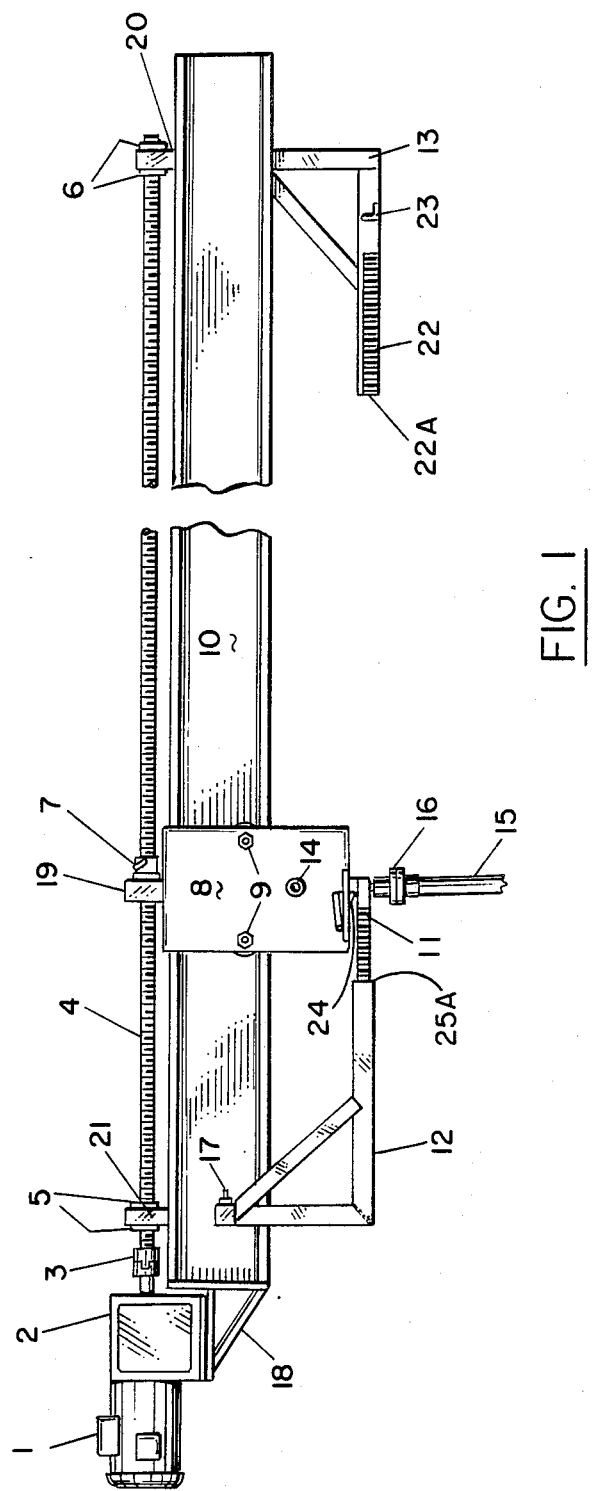
FIG. 1 is a right side view of the apparatus of the present invention.

In FIG. 1 we have the right side view of the automatic wash or spray apparatus of the invention. The drive motor 1, when powered, drives a gear box 2, which in turn is connected to a screw gear 4 by an adaptor coupling 3. The adapter coupling 3 can compensate for slight misalignment and may include shock absorbing materials which makes a smoother drive system. The main driving screw gear 4 is itself mounted on the straight I beam track 10 by means of flange bearing 5 in bearing mount 21 and at its opposite end by flange bearing 6 in bearing mount 20. Also mounted on one end of I beam 10 is a motor and gear box support 18 which supports drive motor 1 and gear box 2 upon I beam 10.

Another bearing mount 19 is used with ball nut and flange 7 on screw gear 4 to provide a connection to trolley housing 8 which can move back and forth in response to turning of screw gear 4 in one direction or the other. The turning motion of the screw gear 4 propels or drives the ball nut flange 7 that moves the trolley housing 8 on its inner casters 9 (FIG. 1) and 26 (FIG. 4) down the I beam track 10 to a designated area on the end of I beam track 10.

Figure 2:
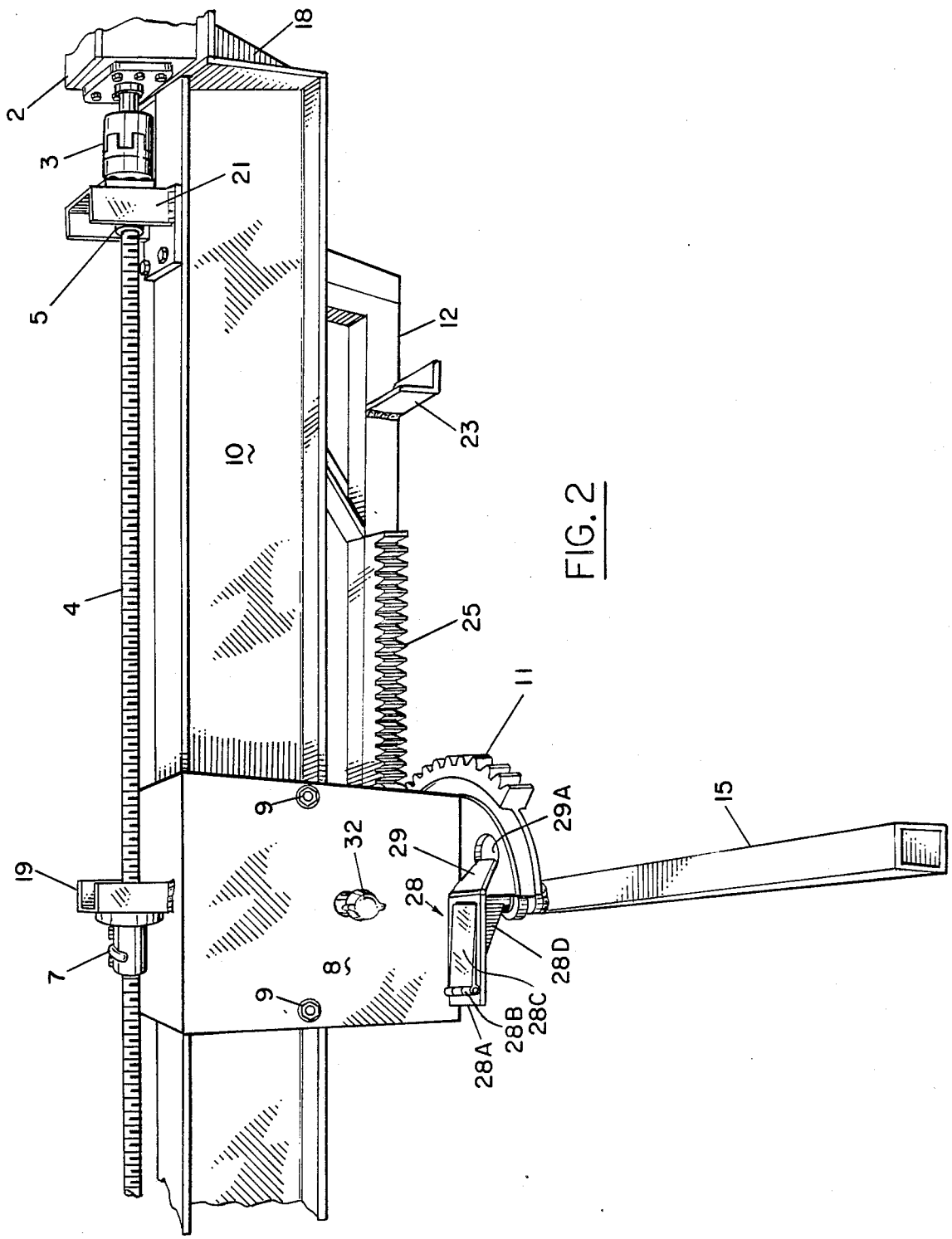
FIG. 2 is a close-up left side view of the apparatus showing action of the invention.
Figure 4:
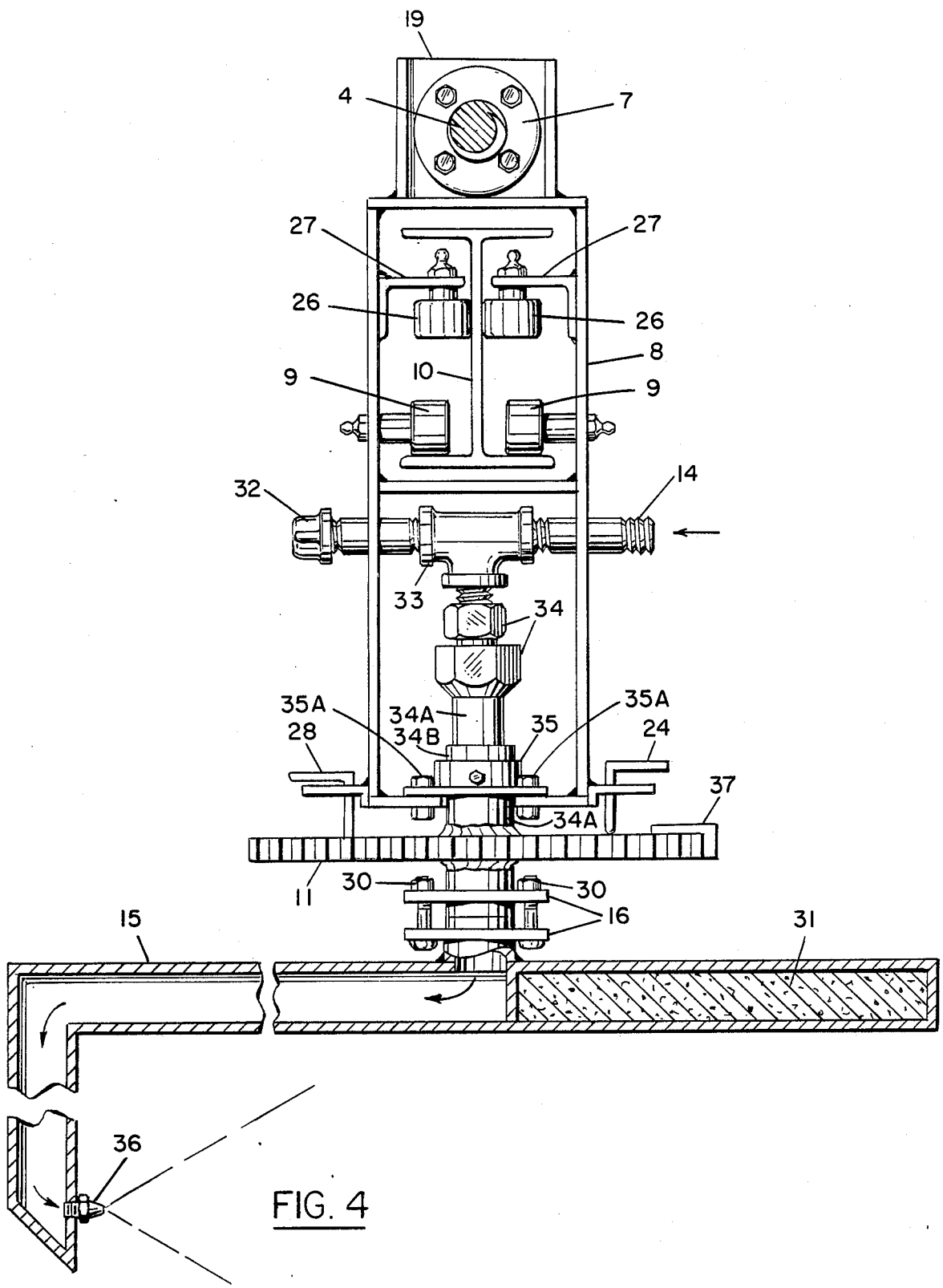
FIG. 4 is a close-up view facing the front of the screw gear/trolley/gear and water boom manifold apparatus.

In FIG. 1, 22A is the beginning of a designated area for turning which begins at the end of gear rack 22 which is mounted to beam 10 offset to one side by gear rack support 13. The designated area beginning at 22A extends to turn support bracket 23 mounted on gear rack support bracket 13. At the opposite end of beam 10 and on the opposite side from the other gear rack support 13 is gear rack support 12 also mounted offset to one side of beam 10. Similarly, gear rack support 12 supports gear rack 25 which is best seen in FIG. 2 and FIG. 7. At the end of gear rack 25 just like the end of gear rack 22 is the beginning of another designated turning area which designated turning area likewise extends to another turn support bracket 23 best seen in FIG. 2. FIG. 1 further shows a liquid inlet pipe 14, high pressure water flange 16, water boom manifold 15, and spur gear assembly 11, all mounted on trolley housing 8. A pair of identical gravity locks 24 in FIG. 1 and 28 in FIG. 2 also seen in FIG. 4 are used to stabilize the water boom manifold 15 by preventing spur gear assembly 11 from moving the wrong way after a turning cycle has been completed as will be more fully explained. A gravity lock holds the spray boom manifold in position in a plane of orientation which is approximately right angled with respect to the longitudinal axis of the I beam 10, by preventing backward rotation forces which arise from reaction of the water sprays some of which are angled specifically to provide some reverse rotational force to hold the manifold against the gravity lock while the trolley travels alongside an object to be sprayed.

Figure 6:
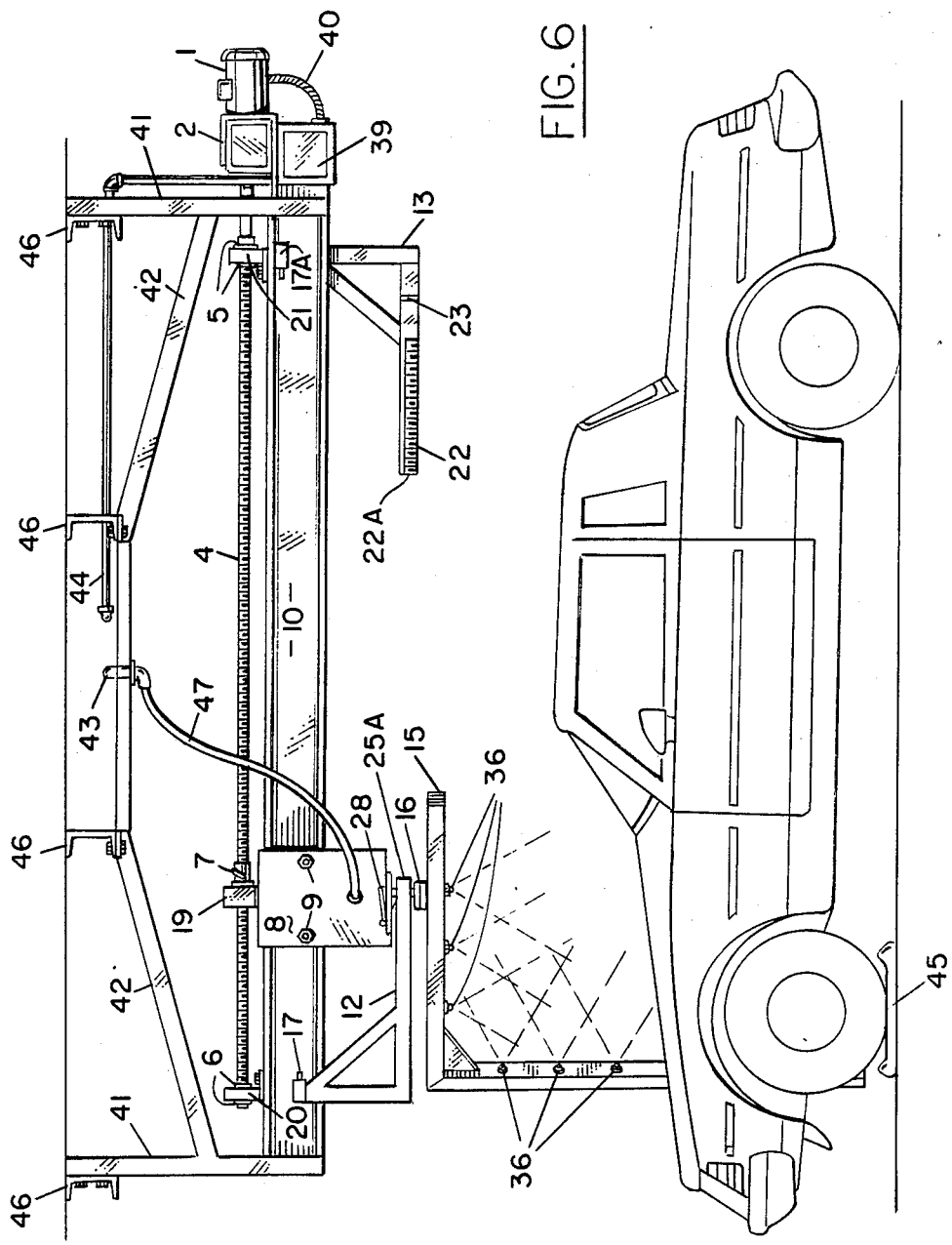
FIG. 6 is a left side view of the fully operational automatic wash apparatus in a vehicle wash bay.

FIG. 6 shows the additional supporting structure that may be used to support the I beam 10 in a car wash bay.

The features are just like those shown in the other Figures except that as compared to FIGS. 1 and 2, FIG. 6 shows that the drive motor 1, gear box 2 and screw gear 4 and their associated bearings and supports can be reversed on the I beam 10 so that the drive motor and gear box are located adjacent gear rack support 13 instead of being adjacent to gear rack support 12 as shown in FIGS. 1 and 2. In any event, FIG. 6 shows the automatic wash apparatus on a designated area to begin a 180 degree water boom manifold 15 rotation.

Figure 3:
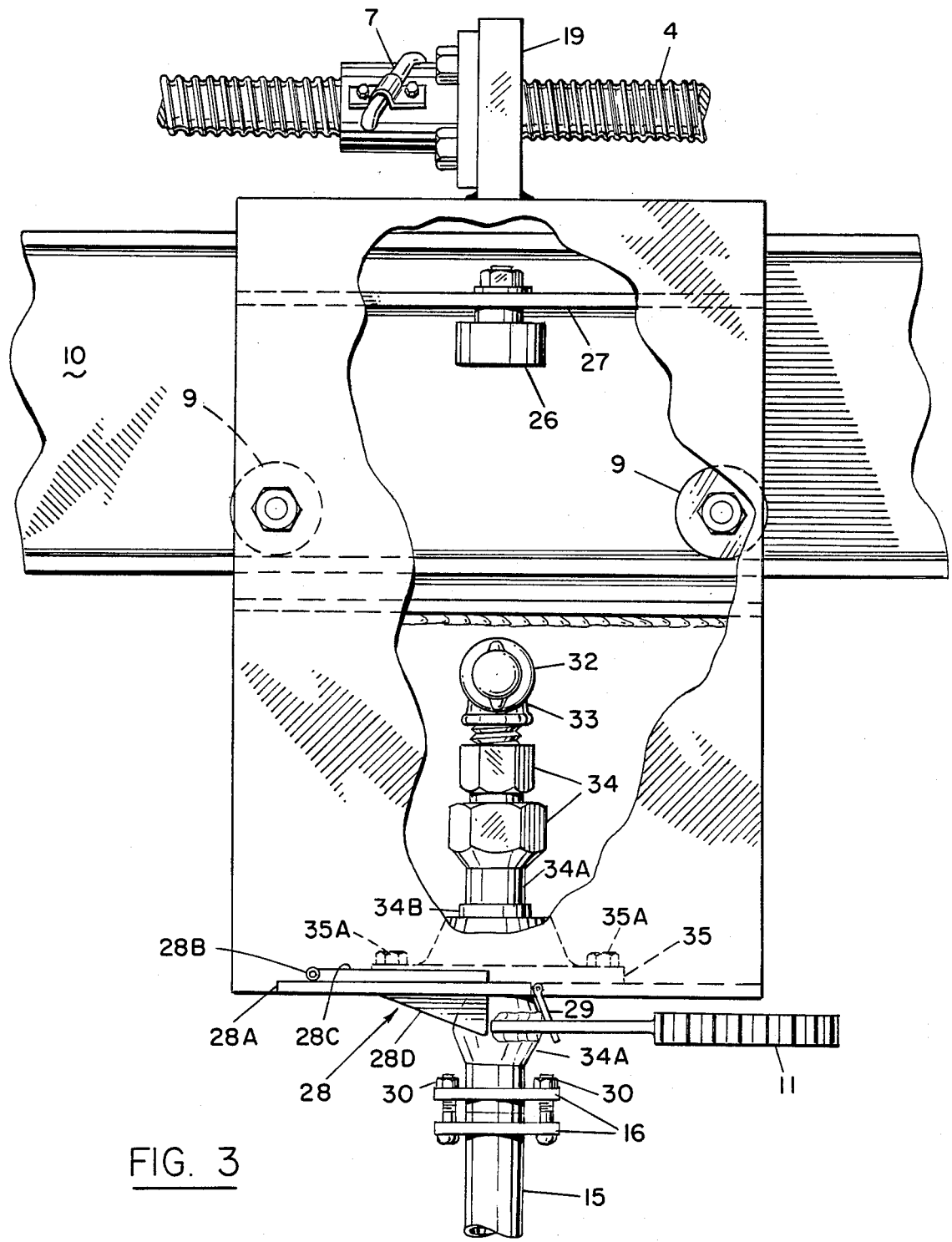
FIG. 3 is a close-up cutaway view of the inner working parts of the trolley apparatus.

FIGS. 3 and 4 perhaps best show how the trolley housing 8 is mounted for stable linear movement along I beam 10 and how it supports water boom manifold 15 and its means for rotation which is spur gear assembly 11. In FIG. 3 bearing mount 19 is fixed to the top of housing 8 and it holds ball nut and flange 7 through which screw gear 4 passes which when turned by the motor 1 through gear box 2 drives the trolley housing 8 along beam 10.

FIGS. 3 and 4 show trolley housing 8 is supported vertically by casters 9 fixed to it and riding on the bottom flange of I beam 10. One caster 9 rolls along on each half of that bottom flange on either side of the web connecting the upper and lower flanges of I beam 10. In addition, the interior of trolley housing 8 has a pair of caster mounts 27 to which are mounted laterally supporting casters 26 which ride either side of the web between the flanges of I beam 10 and thus prevent tilting of the trolley housing.

FIG. 4 shows a high pressure liquid inlet pipe 14 passing through an opening in trolley housing 8 with liquid when connected, entering inlet 14 in the direction of the arrow. Inlet 14 is connected to a liquid inlet hose 47 in FIG. 6 having an inlet water hose connection 43 which of course would be connect to one or more sources of spray liquid by conventional means. By means of conventional valving and piping integrated with conventional controls different spray liquids could be introduced to inlet 14 at different times during a washing cycle as, for example, a washing solution or a rinse solution.

Inlet 14 in FIG. 4 is connected to a pipe tee 33 capped at its other side by pipe cap 32 which may also extend through an opening in housing 8 in line with the opening for inlet 14.

In FIGS. 3 and 4, connected to the stem part of tee 33 is a conventional high pressure water swivel 34 with a downwardly extending pipe portion 34A having a rotatable collar 34B fastened to it and supported integrally by a large flange bearing 35 itself fastened by means of several bolts 35A to the bottom of trolley housing 8. Pipe portion 34A extends on through the bottom of housing 8 to a high pressure water flange 16 and is fastened with water flange bolts 30. High pressure water flange 16 connects pipe portion 34A of water swivel 34 to water boom manifold 15 shown in FIG. 4 in liquid communication, with liquid being able to flow in the direction of the arrows to emanate from one or more nozzles 36 when a source of pressurized liquid is connected to liquid inlet pipe 14.

Figure 5:
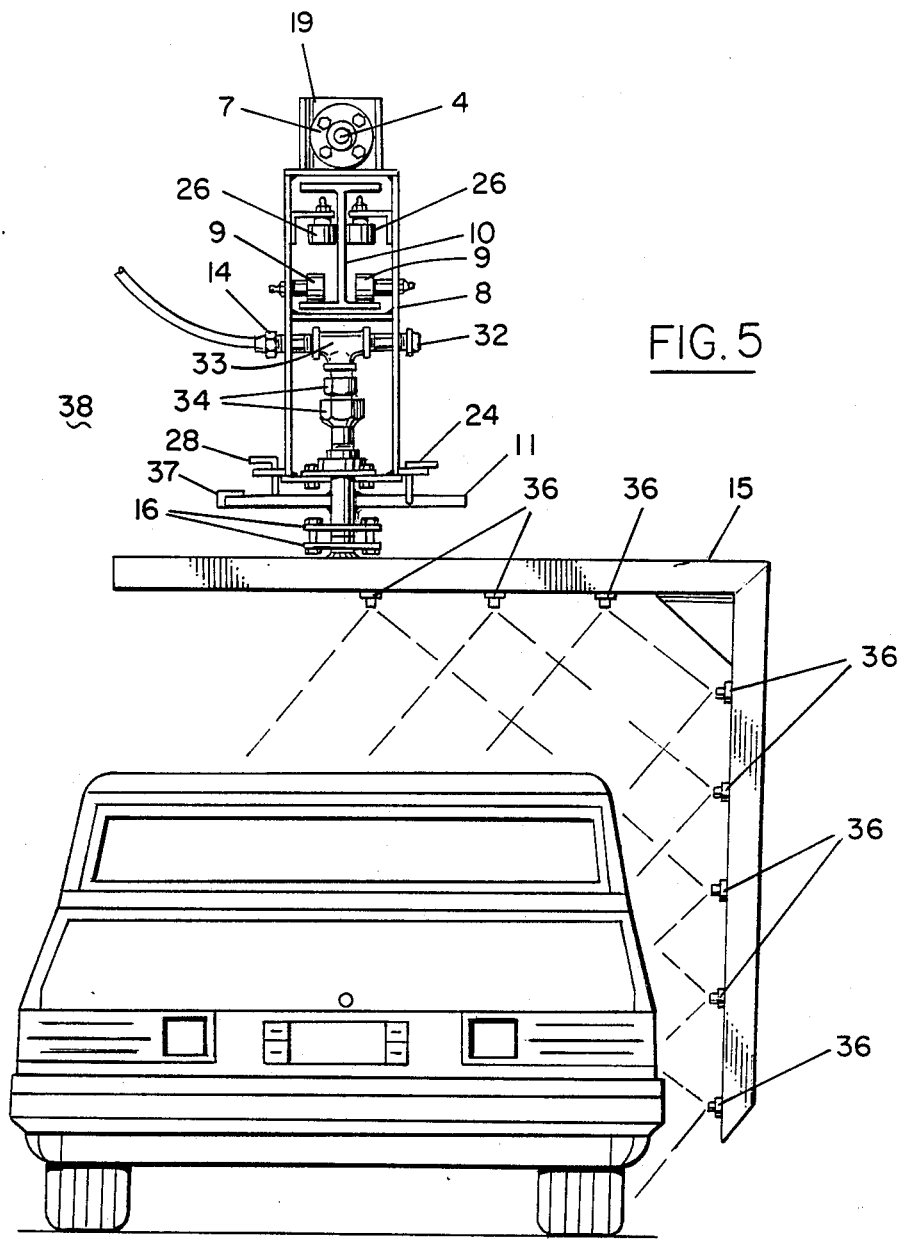
FIG. 5 is a rear view of the automatic wash apparatus washing a vehicle in its fully intended state.

Water boom manifold 15 has an L-shaped construction with a horizontal run and an integral vertical run which is best seen in FIG. 5 preferably with spray nozzles 36 in both horizontal and vertical portions. Thus, boom manifold 15 is a rotatable element extended outwardly away from the center of rotation and from trolley housing 8 so as to allow spraying of a large object such as a car located in spraying position centered under I beam 10 and/or trolley housing 8. Boom manifold 15 preferably has a counterweight portion 31 which extends away from the horizontal portion of boom manifold 15 and is weighted to balance it in order to avoid excessive torque on flange 16 and the other connecting parts fastened to trolley housing 8.

It is clear that boom manifold 15 is directly supported by trolley housing 8 and will move with it back and forth as it travels along I beam 10. Linear movement of trolley 8 along beam 10 will permit the spraying of the top and one side of an object to be sprayed as shown in FIG. 5 and when boom 15 is rotated 180 degrees around an end of the object to be sprayed, it will spray the top and other side of an object to be sprayed, such as a car. Turning or swiveling of the water boom manifold 15 is permitted by rotation at high pressure water swivel 34 which permits rotation without leaking while liquid passes through inlet 14 and nozzles 36.

Connected to pipe portion 34A of the rotatable high pressure water swivel 34 below the bottom of trolley housing 8 at a location above water flange 16 is a spur gear assembly 11 which is seen in various views in FIGS. 1, 2, 3, 4, 5, 7, 8, 9 and 10. The spur gear 11 in conjunction with cooperating gear means, gear racks 22 and 25 at opposite ends and mounted on opposite sides of I beam 10 constitutes a means for 180 degree rotation of boom manifold 15 and a means for activating that rotation respectively at a designated area at each end area of I beam 10.

FIGS. 1, 2 and 3, and 7–10 show that spur gear 11 is essentially half of a complete gear with part of the teeth removed a short distance along the circumference opposite the part of spur gear 11 that interacts with gear racks 22 and 25 to activate rotation at the designated turning areas near each end of the assembly. Spur gear 11 is fixed at its center to pipe 34A, having a diametrical edge running through and on either side of the center of rotation. FIG. 1 shows trolley housing 8 moving to the left. Water boom manifold 15 would be extended away on the opposite side of beam 10 from gear rack support 12. Spur gear 11 would not yet have rotation activated by gear rack 25 hidden behind support 12. FIG. 2 is a closer up view of FIG. 1 from the opposite side at a point in time when the spur gear 11 has just engaged straight gear rack 25 and been activated by it.

Spur gear 11 has an alignment bracket 37 fixed to the edge of it that will come into contact with gear racks 22 and 25 alternately during operation. Bracket 37 is radially oriented near one extremity of the diametrical edge of spur gear 11 and because of the rotation caused by interaction with respective gear racks 22, 25, alternately, bracket 37 is always located so as to contact the end of a gear rack when spur gear 11 is advanced to a designated turning area. FIG. 4 shows the alignment bracket 37 that will align the teeth of spur gear 11 with the teeth of gear rack 25 on FIG. 2 that will swing the water boom manifold 15 in the opposite position on the other side of the I beam track 10 as it completes an end cycle turn. Once spur gear 11 is clear of gear rack 25, the turn support bracket 23 ensures a complete 180 degree turn which then activates gravity lock 24 schematically shown in FIG. 4 (better seen by way of FIG. 2) that prevents water boom manifold 15 from counter-rotation or from swinging back into the gear rack 25 that it has just cleared.

It should be noted that gravity locks 24 and 28, as indicated schematically in FIGS. 4 and 5, are identical in construction and operation but are mounted on opposite sides of housing 8. Gravity lock 28 has a slotted support 28A on which rests a movable plate 28C with hinge 28B fixed to support 28A which allows a tapered triangular vertically disposed portion 28D fixed to plate 28C to move up and down in the hidden slot of support 28A. A vertical edge on triangular portion 28D, when in the locking position of FIG. 2, prevents spur gear 11 from rotating in a direction opposite to the normal direction of rotation caused by operation of the trolley housing 8 moving to the right in FIG. 2. This causes coincident engagement of spur gear 11 and cooperating gear rack 25 which causes counterclockwise rotation of spur gear 11 and the attached boom manifold 15 when viewed from above. The length of gear rack 25 and its equal counterpart gear rack 22 is arranged to create near 180 degree or half circle rotation of spur gear 11 and boom manifold 15 around the end of an object to be sprayed in the designated turning area near each end of beam 10. Continued travel to the right of trolley 8 in FIG. 2 causes the teeth of spur gear 11 to leave engagement with the teeth of cooperating gear rack 25 until the edge of the last tooth on spur gear 11 clears the last tooth of gear rack 25. Momentum of the swinging rotating boom arm manifold tends to complete the 180 degree rotation of the end cycle turn to the extent the 180 degree turn has been mostly but not completely made. Further movement of the trolley 8 causes part of the diametrical edge of spur gear 11 to contact the flat vertical surface of turn support bracket 23 to positively ensure complete 180 degree half circle rotation of spur gear 11 and boom 15. At this point, a suitably set limit switch hidden in FIG. 2, but seen as switch 17 in FIGS. 1 and 6 reverses drive motor 1 to begin driving the trolley housing 8 in the opposite direction (left in FIG. 2) along beam 10. Because part of the teeth on spur gear 11 of FIG. 2 are removed at the side opposite the gear engaging side having the alignment bracket 37, there is then a clearance between spur gear 11 and gear rack 25 (or alternately gear rack 22 on the other end) after rotation so that the reversal of travel of trolley housing 8 is not interfered with as trolley housing 8 moves in the opposite direction along beam 10 after the end cycle turn is complete and the direction of movement is reversed.

Note that when the counterclockwise rotation of spur gear 11 and boom 15 occurs by movement to the right in FIG. 2 of trolley housing 8, there is no interference from gravity lock 24 mounted oppositely on the other side of trolley housing 8 and offset from the position of gravity lock 28 because the diametrical edge of spur gear 11 pushes against the sloping downwardly hanging triangular edge of gravity lock 24 (identical but turned 180 degrees from the orientation of gravity lock 28) and simply raises it up out of the way. Similarly, the counterclockwise turning diametrical edge of spur gear 11 raises gravity lock 28 out of the way as spur gear 11 turns and the downwardly depending point of the triangular portion 28D harmlessly rides along on the surface of spur gear 11 as it turns. Once the 180 degree turn being initiated in FIG. 2 as above described is completed however, gravity lock 24 is free to fall back down with the vertical edge of the triangular part catching some part of the diametrical edge of spur gear 11 thus keeping it and attached boom manifold 15 from rotating the opposite (clockwise) way.

Also a drag spring 29 seen in FIG. 2 in connection with gravity lock 28 may be fastened to the gravity lock support and under spring pressure may ride on the upper surface of spur gear 11 which may also have suitably located openings such as opening 29A in which the end of drag spring 29 under the influence of its spring may catch and can tend to hold the spur gear 11 in proper position against a corresponding gravity lock. In FIG. 2, drag spring 29 puts friction on spur gear 11 to prevent the water boom manifold from swinging too far, tending to bring it back into gravity lock 28 or as the case may be, gravity lock 24. Another corresponding opening 29A will function identically with another drag spring 29 attached to the corresponding support for gravity lock 24 hidden from view in FIG. 2 on the other side of trolley housing 8. Additionally, as in FIG. 5, the spray nozzles 36 are set at a very slight angle which causes the water boom manifold 15 to have slight back pressure against a gravity lock 28 .(or 24), thus completing an end cycle, setting it up ready for a like function on the opposite end of I beam track 10.

It should be evident that when the now 180 degree rotated spur gear 11, boom manifold 15 and trolley housing 8 move in the opposite direction along beam 10 after the turn made by activation caused by gear rack 25, toward the opposite end of beam 10, the vertical part of boom manifold 15 will be on the opposite side of I beam 10 and will be extended therefrom to spray the opposite other side of an object to be sprayed which may be centered under I beam 10. Upon reaching the designated turn area near the other end of I beam 10 where gear rack 22 begins, another exactly corresponding turn will be activated as has been described in connection with FIG. 2 above. Because gear rack 22 is located on the other side of I beam 10 from gear rack 25, the rotation of spur gear 11 and manifold 15 viewed from above will continue to be in a counterclockwise direction and when a similar limit switch 17A in FIG. 6 causes another reversal of drive motor 1, the trolley housing and attached components will again move along beam 10 towards gear rack 25 as in FIG. 1 whereupon another turn around an opposite end of an object to be sprayed will be accomplished.

Thus the water boom manifold will continue to circle a properly positioned object to be sprayed always turning in the same rotational direction, spraying or washing both sides and both ends of an object like a car in a continuous sequence until the desired number of cycles is achieved as controlled by a conventional control system. This rotational sequence is followed even though the I beam track is straight and not oval as is usual with more complicated conventional car washing systems.

FIG. 3 further illustrates the use of a drag spring 29 from a side elevation showing part of the drag spring extending through an opening in spur gear 11. FIG. 5 shows the automatic wash assembly as it moves from rear to front of a car, spraying the top and right side. Spur gear 11 is seen with alignment bracket 37 ready to engage gear rack 22 or 25 as the case may be in a vehicle wash bay 38 It shows an appropriate relationship between an object to be wahsed (a car) and a spray boom manifold 15 with a plurality of nozzles 36.

FIG. 6 illustrates a completed installation in a conventional bay 38. Drive motor 1 with motor starter 39 and "sealtite" conduit 40 are mounted on I beam 10 and connected to electric supply 44 to drive gear box 2. Gear box 2 drives screw gear 4 mounted on beam 10 by bearing mounts 20, 21 and flange bearing 5, 6. Bearing mount 19 and ball and nut flange 7 on screw gear 4 are attached to trolley housing 8 which rolls along I beam 10 on casters 9. The captive balls of the conventional ball and nut flange ride in the "threads" of the screw gear and move as the screw turns to drive the trolley along in the direction of the axis of the screw. The remainder of the parts below I beam 10 are described in discussion of previous Figures. The building structure 46 is illustrated as beams seen on end with "C" shaped cross section which are used to support I beam 10 by means of I beam supports 41 and I beam support braces 42. A conventional wheel switch 45 is seen under the front wheel of a car positioned properly for being sprayed and which may be used to activate one or more wash and/or rinse cycles by input of suitable liquids at input water hose connection 43, which is fixed and connected to a suitable length of inlet liquid hose 47 connected at trolley 8 to provide spray through nozzles 36.

In FIGS. 7 through 10 is a slightly modified embodiment of the automatic washing apparatus of the invention. FIG. 7 is a partially cut away perspective view of the functional components. A drive motor with integral gear reducer 50 and motor starter 52 is attached by motor support 54 to I beam track 10. The output shaft from the motor/gear reducer assembly drives screw gear 4 as before. Screw gear 4 is supported upon I beam 10 by means of bearing mount 21 and flange bearing 5 together with an equivalent bearing mount and flange bearing which is cut off in FIG. 7 but as seen in FIG. 1 in the form of bearing mount 20 and flange bearing 6. The bearing mounts and flange bearings are of course bolted together to hold them in place. Intermediate to these bearing mounts on bearing supporting screw gear 4 is ball nut and flange 7 which is bolted to bearing mount 19 itself in turn rigidly connected to trolley housing 8. Bolts 56 connect ball nut and flange 7 to bearing mount 19.

The mounting for trolley housing 8 on I beam 10 is somewhat modified from the previous Figures in that two flange casters 58 roll on either side of the bottom flange of beam 10, being bolted to trolley housing 8 by bolts 60. Similarly, another set of flanged casters 58 roll along either side of the top flange of I beam 10 with the flanges of the casters in all cases in contact with the side edges of top flange 62 of I beam 10 and bottom flange 64 of I beam 10. An identical set of casters 58 and bolts and supporting bolts 60 as seen on one side of I beam 10 in FIG. 7 are also present but hidden from view on the opposite side of the I beam 10 and in opposite relation thereto. Supported and stabilized by casters 58, trolley housing 8 is free to roll along I beam 10 under the influence of the drive train assembly 55 attached to the top of trolley housing 8. Rotation of screw gear 4 by motor and gear reducer acting on ball and nut flange 7 in connection with bearing mount 19 causes trolley housing 8 to roll along beam 10 in either direction depending on the direction of rotation of screw gear 4. This drive train provides a smooth and easily controlled uniform movement for trolley housing 8 during operation.

Through an opening 66 in the side of trolley housing 8 extends liquid inlet pipe 14 which will be connected to a source of pressurized liquid as before. Through connection 68, pipe 14 extends through the side of housing 8 via opening 66 where it is attached in liquid communication with the upper portion of high pressure water swivel 34 which has an upper portion and a lower portion as indicated in FIG. 7 by the lead lines. The lower portion of high pressure water swivel 34 is a rotatable element free to rotate along with a downwardly extending pipe portion 34A supported by a rotatable bearing collar 34B integral with large flange bearing 35 mounted supportingly on the bottom of housing 8 by bolts 35A. Downwardly extending pipe portion 34A further is connected in liquid communication by a tee 72 in boom manifold 70 having an extended horizontal portion 74 integrally connected to a downwardly extending vertical portion 76 having a plurality of spray nozzles 36 mounted thereon to direct sprays downwardly towards the top and sides of an object to be sprayed centered in spraying position under I beam 10.

A mechanical means for 180° degree rotation is provided in spur gear 78. A modified spur gear 78 is fixed to rotatable pipe 34A below housing 8. Spur gear 78 is essentially a half gear fixed to pipe 34A at approximately its center of rotation and having teeth 80 and a diametrical edge 82. At one extremity along diametrical edge 82, spur gear 78 has an alignment tooth 84 shaped to contact the end of a straight gear rack 25 or 22 and align the teeth of spur gear 78 with teeth 100 of either gear rack 22 or 25 to initiate an end cycle for the simultaneous turning of spur gear 78, pipe 34A and boom manifold 70 around the end of an object to be sprayed. The gear racks 22 or 25 constitute a mechanical means for activating 180° degree rotation. The end cycle turn is initiated by movement of trolley 8 in the direction of the arrow of FIG. 7 until alignment tooth 84 contacts the end 25A of gear rack 25 which is the beginning of a designated turn area. In FIG. 7, gear rack 25 is mounted to a slightly modified offset mounting bracket 86 fixed to one side of I beam 10. Bracket 86 extends outwardly from the side of I beam 10 and is mounted so that the teeth of the spur gear and the gear rack can properly intermesh when the end cycle turn is begun. A spur gear bracket 88 is preferable rigidly fixed between spur gear 78 and the horizontal portion 74 of boom manifold 70. In this instance, boom manifold 70 is simply constructed of ordinary pipe and pipe connections instead of being rectangularly shaped as was boom manifold 15. The shorter horizontal portion 74 of boom manifold 70 may be counterweighted as before to offset the additional weight caused by the extended horizontal opposite portion of 74 and its attached vertical part 76 which is made heavier by contained liquid flowing through opening 14 through water swivel 34 and pipe 34A into manifold 70 and exiting through the plurality of nozzles 36.

FIG. 7 shows the position of the apparatus with trolley 8 moving in the direction of the arrow on beam 10 and the boom manifold 70 extended perpendicular to the direction of travel to spray the side of an underlying car. The action shown is just before the initiation of a turn that will rotate boom manifold 70 in a counterclockwise direction looking down, around the end of an object to be sprayed, in a 180 degree turn that will bring vertical portion 76 of manifold 70 around to the opposite side of the object to be sprayed. The action is continued in FIG. 8. A modified gravity lock 90 is mounted on one side of housing 8 as indicated in FIG. 7. Gravity lock 90 is centrally slotted to slide up and down by bolt and washer combination 92. Gravity lock 90 has a central slot 94 and is essentially rectangular in shape except for a sharply angled lower edge 96 having a point 98. Another gravity lock 91 (FIG. 8) is mounted exactly the same way on the opposite side of trolley housing 8 and in exactly the same position except that it is offset from and turned 180 degrees on its vertical axis so that the angled edge 96 is angled in opposite direction and its vertical edge adjacent to point 98 may come in contact with a portion of diametrical edge 82 to prevent boom manifold 70 from moving opposite the direction of the arrow shown in FIG. 7. It is easily seen that gravity lock 90, as seen in FIG. 7 will not hinder or interfere with the counterclockwise rotation of spur gear 78 and its point 98 will merely ride along on spur gear 78.

FIG. 8 is a view looking down on the assembly of FIG. 7 just as it has entered a designated turn area with alignment tooth 84 contacting end 25A of gear rack 25 to begin the desired rotation of the end cycle. Here we see the top flange 62 of I beam 10 with trolley 8 rolling with its casters riding on the flanges of I beam 10 and supported therealong, the motion being in the direction of the arrow parallel to I beam 10 toward turn support bracket 23 mounted on modified bracket 86 in line with gear rack 25. Thanks to alignment tooth 84, the teeth 80 of spur gear 78 properly and automatically engage the corresponding teeth 100 of cooperating gear rack 25 or its counterpart gear rack 22 since the end cycle at the opposite end of I beam 10 is exactly like the operation at the end which has gear rack 25 instead of gear rack 22. Since after the one end cycle rotation, as example the one shown beginning in FIG. 7 and completed in FIG. 10, the gear rack contacting tooth has been moved by 180 degrees, the gear rack to begin the other end cycle, as example gear rack 22 which is illustrated in FIG. 1, is necessarily located on the opposite side of beam 10 but in the same relative location and position.

Note that adjacent and opposite diametrical extremity of spur gear 78 opposite the side which has alignment tooth 84 is an untoothed gap 102 in which some of the teeth 80 around the circumference have been removed. That portion may also preferably have a tapered edge portion 104 which upon continued motion will eventually interact with turn support bracket 23 to ensure the complete 180 degree end cycle turn. This may be referred to as the non-gear rack engaging side of spur gear 78 which as may be seen in FIG. 10 allows traverse in the opposite direction that that of FIG. 7 without engagement or restriction of spur gear 78 with gear rack 25. After the end cycle turn is complete, there is thus a clearance between the untoothed gap portion 102 of spur gear 78 and the closest part of a given gear rack 25 or 22 as the case may be. In FIG. 8 as trolley housing 8 continues to move in the direction of the parallel arrow, the teeth 80 of spur gear 78 continue to engage and roll along gear rack 25 rotating boom manifold 78 until the last tooth 106 and what might be called the non-gear engaging side comes free of gear rack 25 whereupon continued movement of the trolley housing 8 will bring the tapered edge 104 into contact with turn support bracket 23 just before the 180 degree turn is completed and will positively complete the 180 degree counterclockwise turn of spur gear 78 and its attached boom manifold 70. Boom manifold 70 may tend to continue by momentum to turn somewhat beyond 180 degrees but the spray nozzles 36 are slighly angled to provide a slight counter-rotational force which will tend to rotate boom manifold 70 and spur gear 78 opposite the direction of end cycle rotation and the vertical edge of one of gravity locks 90 or 91 will drop down in contact with part of the diametrical edge 82 of modified spur gear 78 to resist such counter-rotation. This is indicated by the position of the gravity lock 90 on the gear rack 25 side of I beam 10 as indicated in FIG. 10.

FIG. 9 is a side view of FIG. 8 showing the proper positioning of the offset oppositely positioned gravity locks 90, 91 on either side of trolley 8 with gravity lock 90 on the near side riding along on its point 98 on spur gear 78. The opposite, far side, gravity lock 91 is free to and has fallen down ready to play its locking roll after the next rotation.

Figure 10:
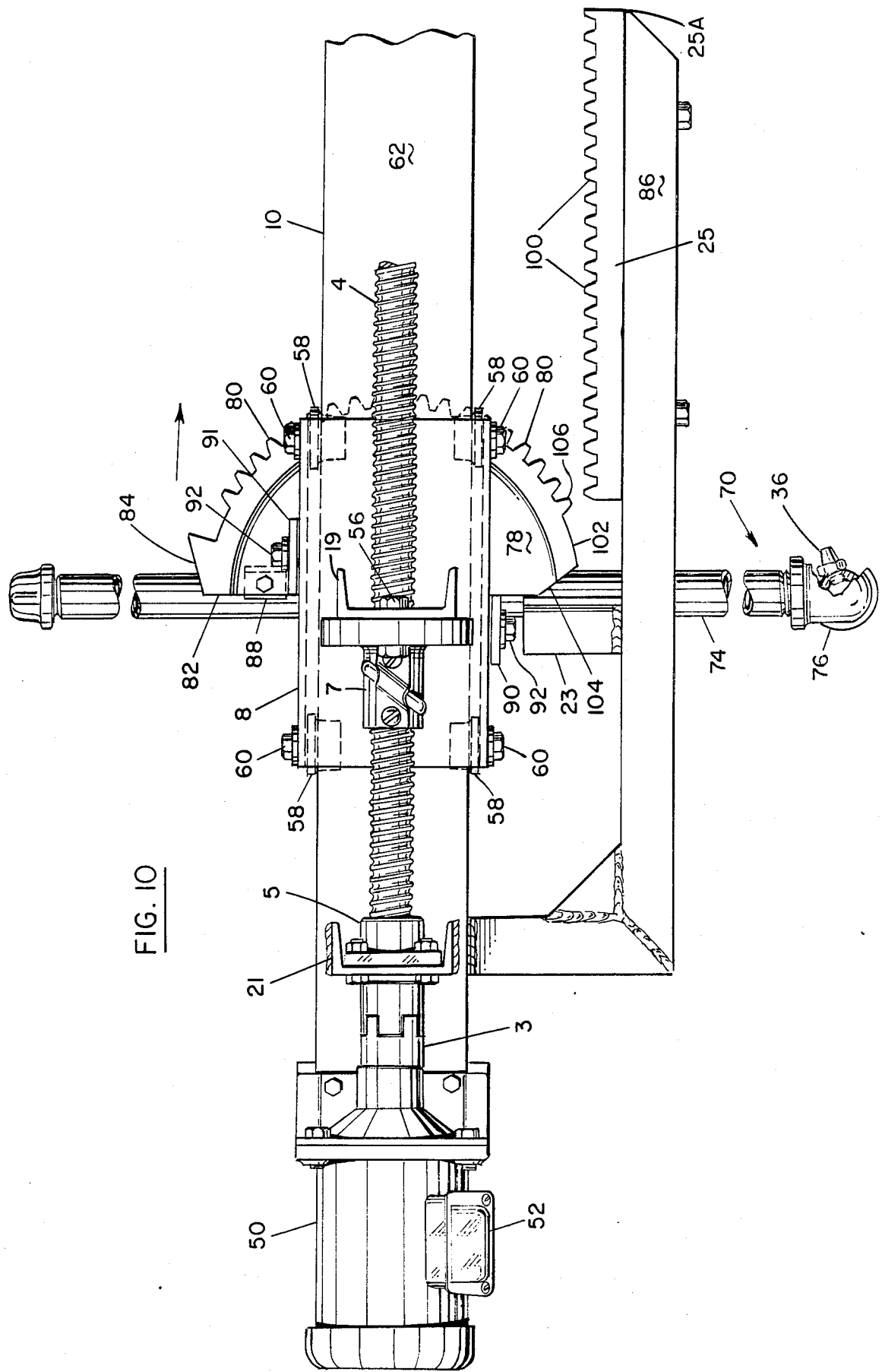
FIG. 10 is a top view of the slightly modified second embodiment of FIG. 7 after the 180 degree turn of the water boom manifold has been completed with the trolley now ready to move in the direction of the arrow.

FIG. 10 shows the completed end cycle turn of the modified assembly shown in FIGS. 7, 8 and 9 with the trolley 8 at the very end of the designated turn area just as it begins moving in the reverse direction which is the direction of the arrow in FIG. 10. It is a view from above looking down on the completed turn. Modified bracket 86 is seen extending out from the gear rack side of I beam 10 supporting gear rack 25 having an end 25A defining the beginning of the designated turn area extending to turn support bracket 23 delineating the end of a designated turn area therebetween. Spur gear 78 with teeth 80 around most of its circumference has alignment tooth 84 on the side now opposite the gear rack 25 after the turn. And because of gap 102 where several teeth 80 have been removed from the circumference of half gear 78, there is a clearance between last tooth 106 and the teeth 100 of gear rack 25, consequently gear rack 78 is free from further engagement with gear rack 25 after the turn and is free to move linearly along it carried along with boom manifold 70 by trolley housing 8.

At this point shown in FIG. 10, an appropriately located limit switch (not shown) stops motor 50 from driving screw gear 4 any further toward the motor end of I beam 10 and by appropriate conventional controls motor 50 is reversed which through its integral gear box and adaptor coupling 3 turns gear rack 4 in the opposite direction. This causes trolley 8 to move in a direction of the arrows shown in FIG. 10 which begins a new side spray cycle as trolley 8 travels toward the opposite, non-motor end of I beam 10 carrying spray manifold along with it as has been described previously. Some spray nozzles on manifold 70 are arranged to direct a counter-rotational force opposite to the normal direction of end cycle rotation which tends to hold the diametrical edge 82 back in contact with the vertical edge of gravity lock 90 on the gear rack 25 side of I beam 10.

As the motion continues in the direction of the arrow, the turning process will be repeated at the opposite nonmotor end of I beam 10 near the beginning of another designated turn zone just like the one that has been described in connection with FIGS. 7 through 10. Another gear rack 22 will be offset from I beam 10 on the side opposite gear rack 25 by a similar modified bracket 86 having a beginning designated turn area 22A as indicated in FIG. 1. It is easily seen that when alignment tooth 84 travels to the beginning of the designated turn area, it will begin a new end cycle turn at the opposite non-motor end of I beam 10 in conjunction with this other gear rack, such as gear rack 22 illustrated in FIG. 1. This new end turn cycle will correspond in every respect to the turn cycle described in discussion of FIGS. 7 through 10. The turn will continue to be in a counterclockwise direction and after the turn is completed, another limit switch will again reverse the direction of the drive motor 50 which in continued operation will cause trolley 8 and boom manifold 70 to move once again in the opposite direction as shown in FIG. 7. Linear travel along the I beam of the trolley 8 and boom manifold 70 between a designated turn area at either end of I beam 10 will allow for spraying one side, and after an end cycle, turn the opposite side of an object to be sprayed and the process may be repeated for as many cycles around an object via appropriate conventional controls as may be desired. Once the cycle has been repeated as many times as desired, the appropriate control will shut off the drive motor and close a valve to prevent the flow of additional pressurized liquid into the spray system.

In the best mode, the modified second embodiment of FIGS. 7 through 10 is preferred over the first embodiment because it is somewhat simpler and more economical to construct. Ordinary good quality materials of construction are considered suitable for construction of the automatic wash apparatus. An appropriately controllable fractional horsepower drive motor is all that is required to turn the screw gear and propel the trolley and boom manifold back and forth along the I beam 10. Although not necessary, it is preferred that appropriate limit switches and controls be provided to slow the drive motor to about half speed or less at the initiation of each end cycle turn to allow more time for spraying as the boom manifold moves around each end of an object to be sprayed, such as a car. It is preferable to return the drive motor to its normal speed after each end cycle turn has been completed by the 180 degree rotation of the boom manifold 70 which will spray the opposite side of the car during reverse travel until the next end cycle is initiated when the motor should again be reduced in speed during the turn.

In the best mode the spur gear is sized in accordance with the rest of the parts in operative relationship. A 14 inch outside diameter gear cut in half has been satisfactory. The half circle center may be welded to the pipe or shaft that is to be turned. About 4½ inches of teeth were removed at each extremity of circumference of the half gear by cutting teeth off at the roots. The smooth untoothed area at each end is curved on a smaller but similar radius as the original radius. One end of the smooth part of the gear may have a bumper welded on which is the alignment bracket that always is the part that hits the rack gear (gear rack) on either end to make the corresponding teeth line up when the end of travel is reached and the spur gear is ready to start turning the manifold. The modified spur gear may have its alignment tooth attached or it may be specially cast in the shape shown in the drawings.

Figures 11, 11A:
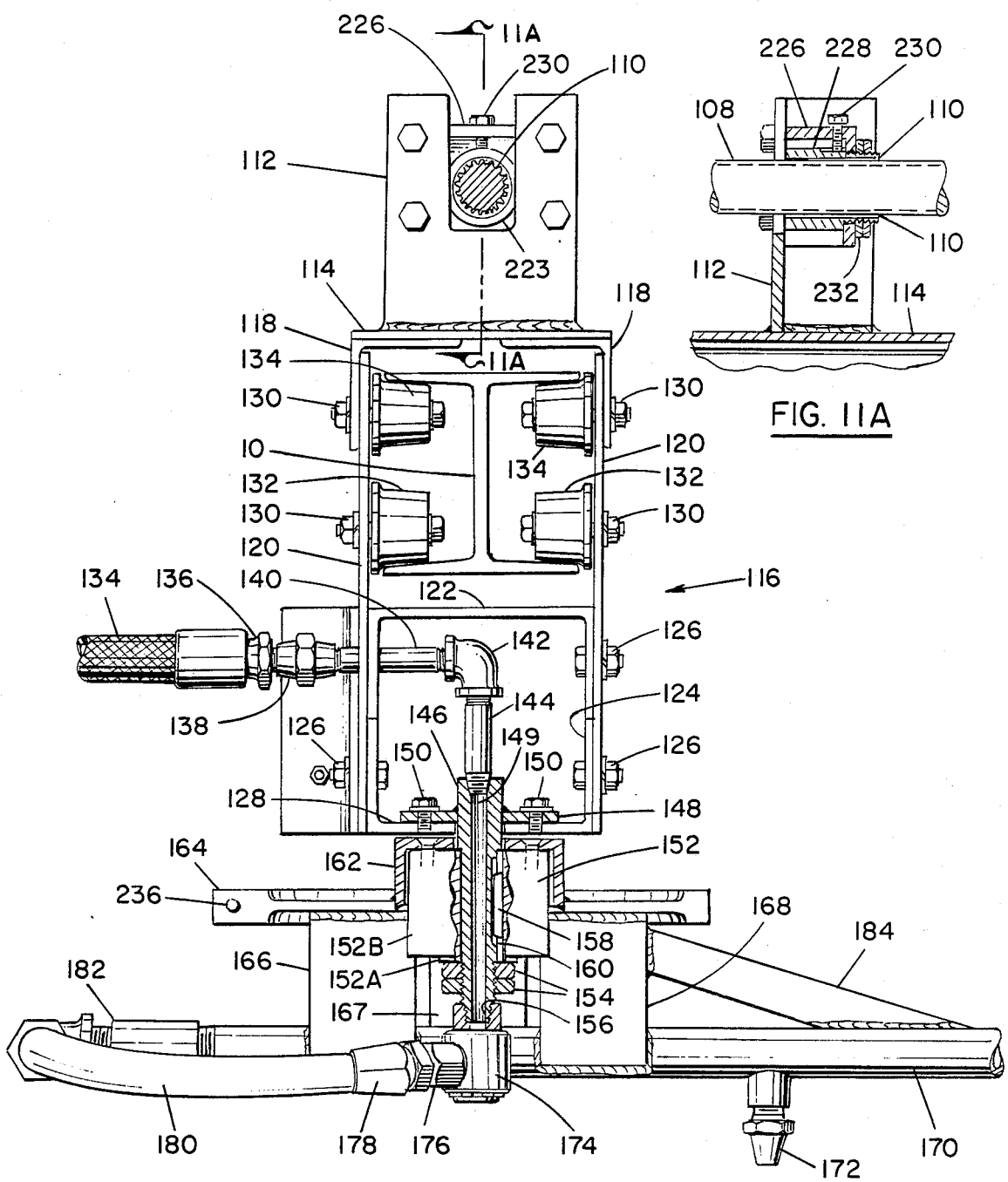
FIG. 11 is a partially cut away sectional end view of the third embodiment showing the improved support structure for the water inlet and rotating boom assembly and the location of the integral one-way clutch bearing.
FIG. 11A is a cut away side detail of the plastic drive nut and screw gear mounted on top of the trolley.

The third embodiment of the invention is illustrated in FIGS. 11-19. The third embodiment has a number of important changes which contribute to reliability, freedom from vibration, smooth operation, improved freedom from maintenance, rigidity and improved performance. FIG. 11 is an end elevation partially cut away to show an improved much more rigid support mechanism for the water boom manifold which does not need gravity locks for prevention of counterrotation. Vibrationless screw gear 108 and plastic drive-nut 110 are mounted in bearing support 112 welded to top plate 114 of the reversable trolley which is generally designated by the reference numeral 116.

Figure 13:
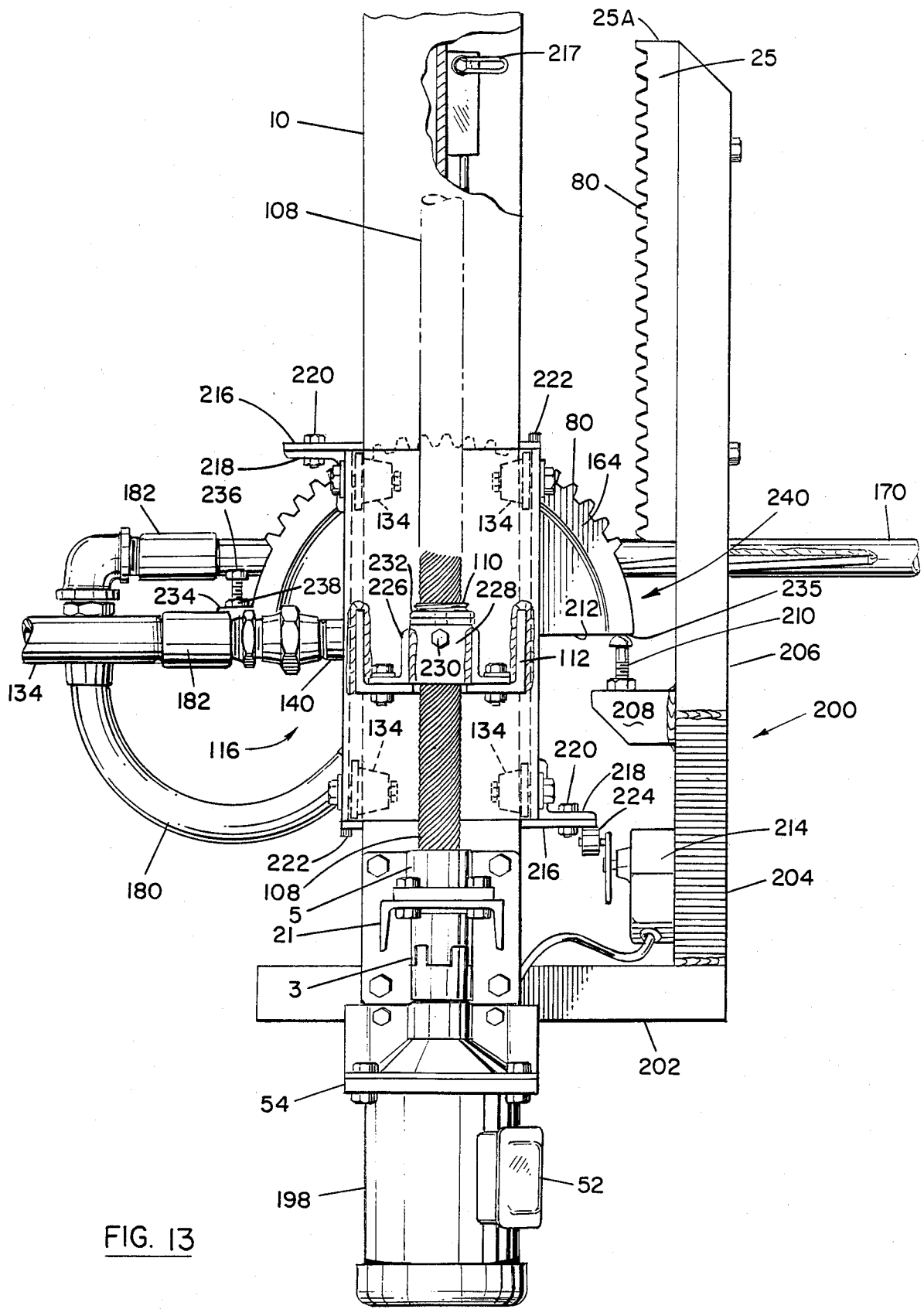
FIG. 13 is a top plan view of the third embodiment showing the improved screw mechanism and adjusting mechanisms for the spur gear, and one of the limit switches which is mounted on the gear rack support.

Seen roughly centered on the top of the trolley in FIGS. 13, 11 and 11A is U-shaped bearing support 112 upon which is mounted bearing support brackets 226 fixed to bearing retainer member 228 holding fixedly plastic drive nut bearing 110. Retaining nut 230 secures plastic nut bearing 110 from rotation in bearing retainer 228. The plastic drive nut adheres to the inside of retainer 228 and has a central bore with threads that correspond to the threads on vibrationless screw gear 108. Bearing retainer 228 and retaining nut 230 securely hold the plastic nut in the supporting brackets so that rotation of the screw gear 108 will cause the bearing brackets and attached trolley to move back and forth along the I beam in a linear direction which is determined by the direction of rotation of the screw gear 108. The bearing retainer 228 containing the plastic nut, may be further secured by means of a pair of jam-nuts 232 threaded on the outside part of the retainer and secured against part of the support bracket member.

Trolley 116 has top angle members 118 fastened to and supporting plate 114 to form the top of the trolley 116. The cross-section of I beam 10 can be seen in the center of the trolley 116. The trolley has side-plates 120 and channel shaped internal stiffener 122 runs the length of the trolley fastened by bolts 126 to support side-plates 120. Another channel shaped internal stiffener 124 is bolted to the sides 120 of the trolley by bolts 126 which forms the bottom 128 of the trolley structure.

Figure 12:
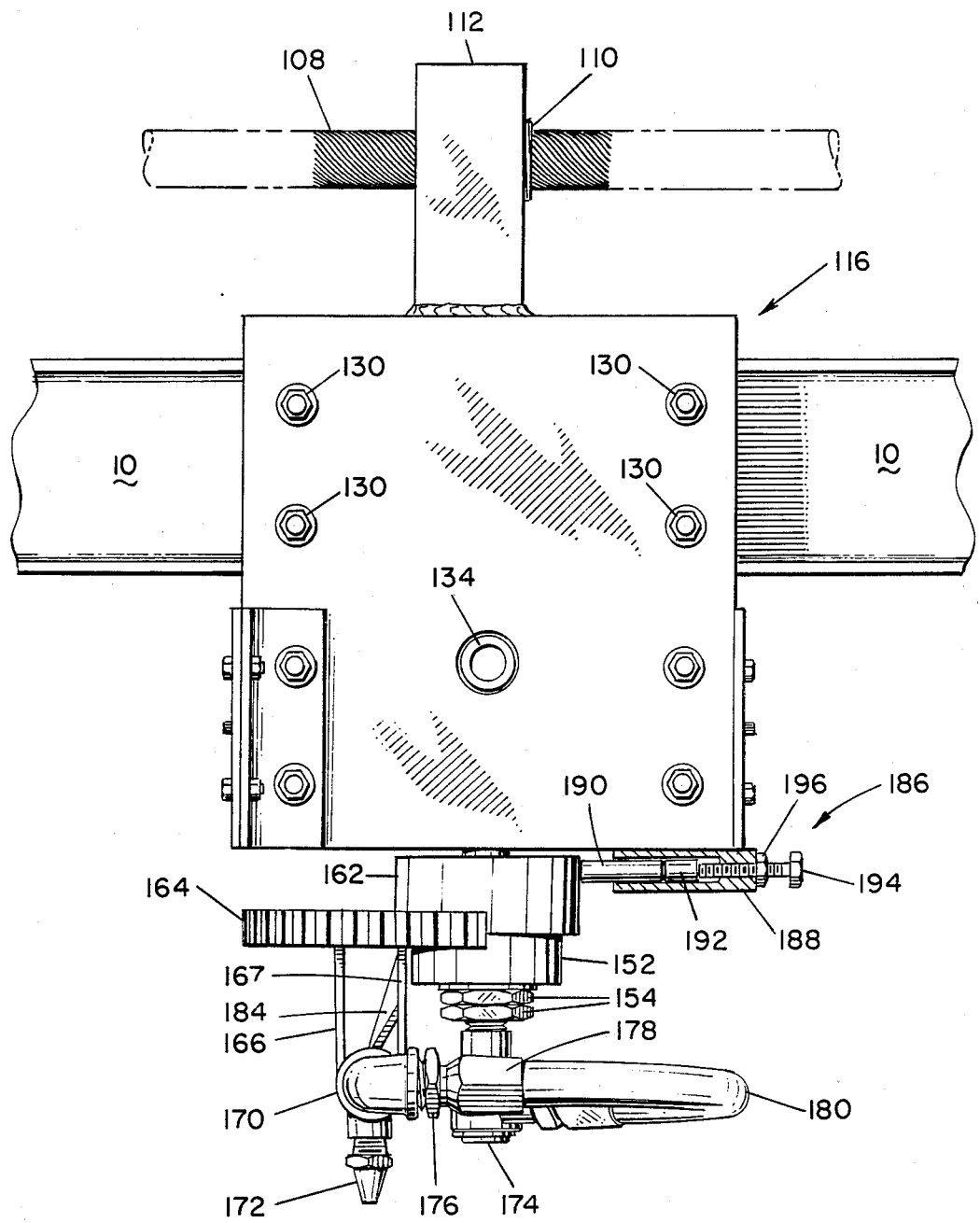
FIG. 12 is a side elevation view of the assembly of FIG. 11.

The trolley is supported by internally mounted flanged casters which are fastened to the sides of the trolley by fasteners 130. These are best seen in FIGS. 11 and 12. Two pairs of opposed spaced apart flanged casters 132 riding on the bottom flange of I beam 10 and two pairs of opposed spaced apart flanged casters 134 riding against the top flange of I beam 10 support trolley 116 on I beam 10 and allow it to move freely back and forth along the I beam under the influence of screw gear 108 and drive-nut 110. Although the spaced apart pairs of casters on each side of I beam 10 are hidden in FIG. 12 their position is indicated by the location of the supporting bolts 130 which are designed to allow the casters to rotate on the bolts.

High pressure water inlet 134 in FIG. 11 is connected by standard pipe fittings 136 and 138 to pipe 140 which enters horizontally through an opening in the side of trolley 116 below the I beam and roughly centered in the trolley itself. Ninety degree elbow 142 continues the water passageway downwardly through pipe 144 connected to it and having a threaded opposite end.

Rigid heavy wall threaded stainless steel pipe spindle 146 attached to pipe 144 continues the water passageway downward, the water passageway being designated by the numeral 149. Flange collar 148 is welded or otherwise fixed to spindle 146 as indicated in FIG. 11, the collar being supported on bottom plate 128 located centrally of the trolley 116 and securely mounted thereon by bolts 150. This provides rigidity for pipe 146.

One-way clutch bearing 152 is generally cyclindrical in shape having an central opening adapted to fit over pipe spindle 146. It is mounted on the spindle below the trolley and held in place by jam-nuts 154 which are threaded and fastened onto lower threaded portion 156 of pipe 146. The inside non-rotating portion of clutch bearing 152 is keyed by means of key 158 in keyway 160 which is oriented longitudinally in pipe 146. This fixes the inside portion 152A of clutch bearing 152 rigidly to rigid pipe 146 while the outer portion 152B of clutch bearing 152 is free to rotate in one direction only. The clutch bearing may be thought of as having an internal pawl and ratchet like mechanism that resists rotation in the opposite direction.

Fixed to and supported by the outer rotation portion of clutch bearing 152 is a cylindrically shaped spur gear support member 162 shown in cross section in FIG. 11. It is securely fastened to the rotating portion of clutch bearing 152 by suitable screws. It is positioned like an upside down open cup. A means for half circle rotation comprising spur gear 164 is rigidly welded or fixed to what would be the opening in the upside down cup shaped member 162 with its center of rotation coincident with the center of rotation of the clutch bearing 152, centered about the water passageway 149 which is vertically oriented. Water passageway 149 may be thought of as centering an axis of rotation for the rotating assembly mounted on the trolley which includes the (half) spur gear 164, rotating part of the clutch bearing, lower water swivel, water boom manifold with connecting hose and bracket supports between the spur gear and manifold.

Supports 166, 167, 168 fastened to and depending from the web portion of spur gear 164 are fixed to water boom manifold 170 which is supported in roughly a horizontal position but has also a depending vertical portion in the same manner as the water boom manifolds of FIGS. 5 or 7. Water boom manifold 170 has a plurality of nozzles 172. Because the supports are rigidly fixed between the spur gear and the water boom manifold the two will rotate together. Finally, high pressure water swivel 174 is threaded on end 156 of pipe 146 and has an outer portion with a water passageway, free to rotate on that pipe. Swivel 174 continues the water passage 149 through pipe connection 176 and hose connection 178. Hose 180 continues around through conventional pipe fittings to connect to the input end 182 of water or fluid boom manifold 170. Thus high pressure water is free to flow from inlet pipe 134 down through pipe 144, spindle 146, through water swivel 174 and hose 180 on into manifold 170 where it can exit through plural nozzles such as nozzle 172. Manifold 170 is further supported by brace 184 rigidly connected between manifold 170 and support member 168, yet the spur gear and manifold are free to rotate in the counterclockwise direction only because of the one-way clutch bearing 152 on which they are one-way rotatably supported.

Another feature of the third embodiment is seen by reference to FIG. 12, which is a side elevation of the trolley and the supported rotatable water delivery and spray manifold system. Mounted to the bottom of the trolley, is a simple friction device designated generally by the reference numeral 186. The friction device has a housing 188 from which extends an aluminum rod 190 in contact with spur gear support member 162 under the influence of rubber member 192 forced against the end of the rod 190 by screw 194 fixed in place by nut 196. Tension is increased by unloosing the lock nut and turning the screw to compress the rubber which forces the aluminum rod tighter against member 162. The friction is adjusted to prevent over rotation caused by inertia after the spur gear completes its turn and disengages from the rack gears at either end of the assembly.

A plan view of the third embodiment is shown in FIG. 13 which shows the drive motor end of the unit. Drive motor 198 with starter 52 has motor support 54 and an internal gear reducer with a gear ratio different from the other embodiments for a purpose which will be described. Adapter coupling 3 and bearing support bracket 21 support flange bearing 5 on the top flange of I beam 10. Vibrationless screw gear 108 is supported thereby. A similar mounting bracket 21 and flange bearing 5 supports screw gear 108 on the I beam at the opposite end from the motor. Trolley 116 is shown located near the motor end after the water boom has just completed and end turn at a designated turning area as has been previously described. Pairs of opposed casters 134 on trolley 116 are seen in phantom against the upper flange of I beam 10.

A modified gear rack assembly designated generally by the reference numeral 200 is supported underneath I beam 10 by horizontal support member 202, angled support member 204 connected between member 202 and logitudinal support member 206 which is offset below the I beam 10 and parallel to it extending towards the non-motor end, to which is mounted rack gear 25. Assembly 200 with rack gear 25 is of course mounted to register with the teeth of spur gear 164 in a horizontal plane. Also mounted on member 206 is lug member 208 on which is mounted an adjustable bumper bolt 210 mounted to just contact the diametrical edge 212 of spur gear 164 at the farthest travel of the trolley. This contact is made just after limit switch 214, also mounted on gear assembly 200, is triggered by an extending portion of trolley 116 which causes motor 198 to rotate in the opposite direction from its previous rotation. The non-motor end also has a modified gear rack assembly 200 with the gear rack on the opposite side of the I beam pointing towards the motor end and also registered with the teeth of the spur gear. It is positioned rotated 180° from the position of assembly 200 shown in FIG. 13 and supported by the I beam.

On opposite ends and opposite corners of the trolley at the lower portion below the I beam are offset plates 216 fastened to the trolley by angle supports 218 and bolts 220. Horizontally opposite angle plate bolts 220, plates 216 may be fastend to opposite corners of the trolley 116 by cap screws 222. Thus when trolley 116 approaches either end of I beam 10, one of the plates 216 will contact a roller 224 on limit switches 214 connected by control wire 215 to trigger reversal of the motor to drive the trolley in the opposite direction.

Also seen in FIG. 13 is half spur gear 164 which is similar to (half) spur gear 84 in FIG. 7 in that it has a mostly hidden extended portion 234 on the periphery slightly forward from the diametrical edge 212 to which is mounted an adjustable bumper screw 236 in a threaded hole on the extended portion. Secured by lock nut 238 the bumper 236 is on the side of the gear which always contacts the ends 22A, 25A of gear racks 22, 25 to initiate rotation of the spur gear and manifold around the ends at the respective designated turning areas. Bumper 236 is adjusted so that when it contacts an end 22A, 25A of a gear rack 22, 25 the teeth 80 will properly mesh with the teeth on gear racks 22, 25 to cause rotation of the spur gear by inter-meshing of the respective teeth as the trolley continues to move in the same direction toward the end of the I beam in the designated turning area. The parts just described are perhaps better seen in FIG. 14, a bottom view.

Figure 14:
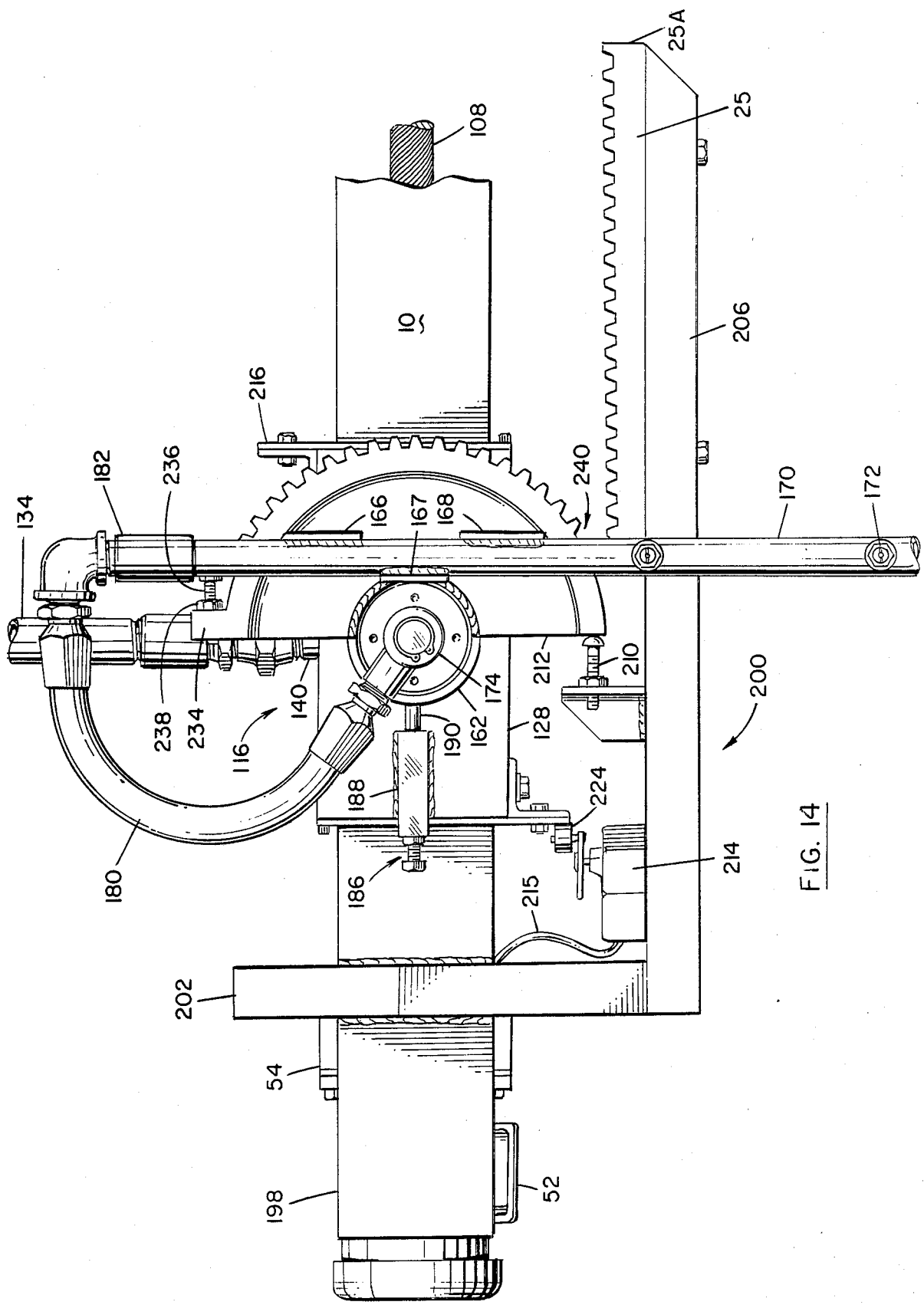
FIG. 14 is a bottom plan view looking up at the third embodiment of FIG. 13.

In FIG. 14 the underside of the motor end of the assembly shows the modified gear rack assembly 200 mounted on the bottom flange of I beam 10, having horizontal transverse member 202 and depending therefrom at right angles, offset longitudinally extending support member 206 with gear rack 25 mounted thereto. To the bottom 128 of reversable trolley 116 is housing 188 of friction device 186 showing rod 190 in contact with the external surface of spur gear support ember 162. One of the offset plates 216 is in contact with roller 224 of limit switch 214 and bumper bolt 210 is in contact with the diametrical edge 212 of half spur gear 164. A gap 240 in the teeth of spur gear 164 extends around the periphery back to the diametrical edge of the spur gear which provides clearance between the teeth of the spur gear and the teeth of the rack gear 25 so that the trolley can move in a direction away from the motor toward the opposite end of the I beam without further rotation until bumper 236 contacts a similarly arranged modified gear rack assembly mounted on the opposite end and on the opposite side of I beam 10 as indicated previously. The position shown in FIG. 14 is the end of a designated turning area. The beginning of that designated turning area is reached when bumper 236 first contacts end 25A of gear rack 25 with the trolley moving towards the motor end. In that case, of course, the teeth of the spur gear are leading as it heads toward the motor end and the spur gear is rotated 180° from the position shown in FIG. 14.

The third embodiment has a means for compensating for vehicles of different length, said means being a means for adjusting the length of linear travel between designated turning zones. The installation is made with the motor end (first end) of the track at the exit of the wash bay. As is customary, the front wheels of the vehicle run onto a trundle where the vehicle stops. The location of the trundle fixes the distance between the front axle and the location of the turning area at the motor end. The nonmotor end (second end) of the track has a modified gear rack assembly 200A which is movable on the I beam between at least two positions to compensate for shorter vehicles. This is important because the best washing action occurs when the spray coming from the spray arm is close to the surface to be washed.

Figure 15:
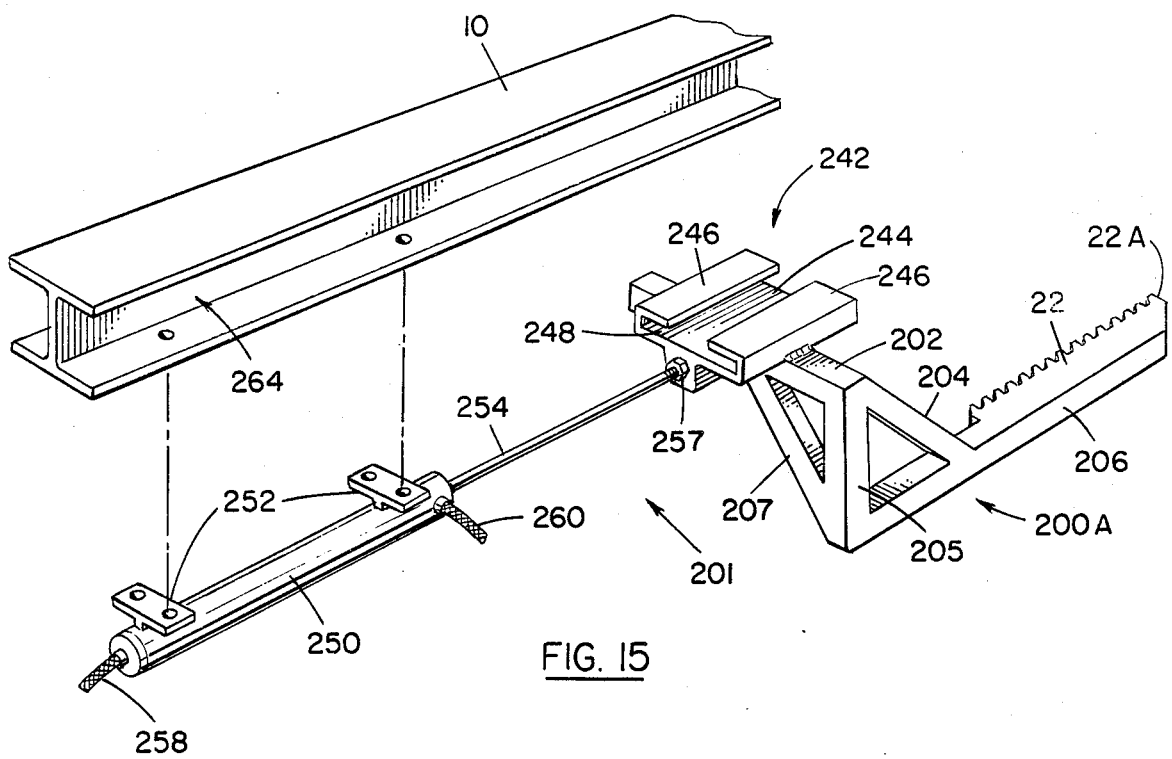
FIG. 15 is an exploded perspective view of the adjustable rack gear and one end of the assembly

In FIG. 15 (designated generally as 201) an exploded view of modified adjustable gear rack assembly 200A is shown in perspective without the auxiliary limit switch 214, lug member 208, or bumper bolt 210. Since this assembly is at the non-motor end of the assembly it has gear rack 22 with beginning of the designated turn area 22A at its terminal end mounted on the longitudinal support member 206, and angle member 204 connected to transverse horizontal gear rack support member 202. This structure is just like modified gear assembly 200. Also like modified gear assembly 200 there is a vertical member 205 and another angled member 207 which are hidden in FIG. 13. These together with angle member 204 form right angle connected triangular shaped supports between members 202 and 206 as shown in FIG. 15.

Modified gear rack assembly 200A differs from assembly 200 because it has a slide member generally designated 242 rigidly fixed at the top of member 202. Slide member 242 has a base 244 with rigidly fixed inturned panels 246 spaced above the base, defining a slot 248. The slot 248 is slightly larger than the lower flange of the I beam 10 and is adapted to slide on to the lower flange of the I beam 10 and through suitable grease or affixed TEFLON bearing plates or other similar slide means is adapted to slide back and forth upon the I beam's lower flange.

An air cylinder 250 with attachment brackets 252 having operating rod 254 connected to slide member 242 at fasteners 257, provides a motive power for moving and positioning the slide member and assembly 200A.

Figure 16:
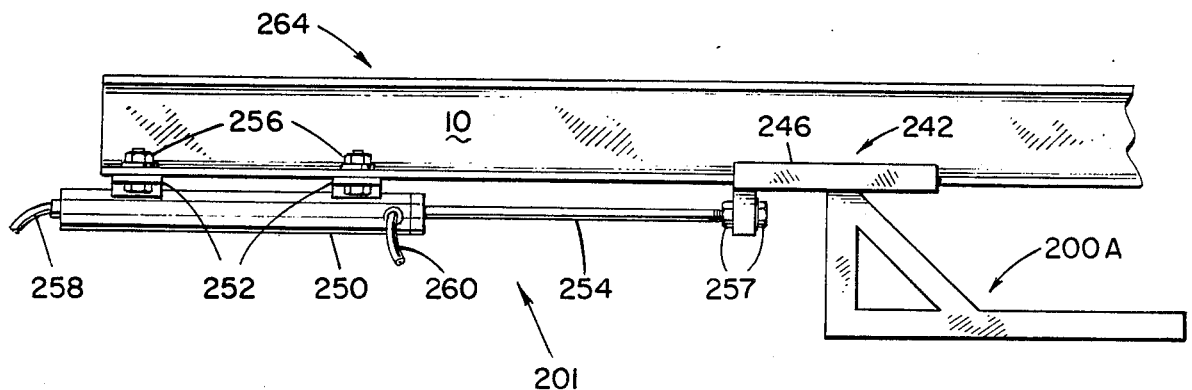
FIG. 16 is a side view of the adjustable rack gear assembly mounted on the I beam track.

FIG. 16 shows cylinder 250 mounted on the lower flange of I beam 10 near the non-motor end 264 by means of fasteners 256 bolted through attachment brackets 252. Slide member panels 246 mounted on either side of the bottom flange of I beam 10 hold slide 242 in place on the I beam. With sufficient lubrication the slide member and assembly 200A will move in response to the position of the operating rod of the air cylinder when the piston inside is activated by air from a control device through air lines 258 and/or 260. The operation of the device will be described later. It is shown in the fully extended position.

Figure 17:
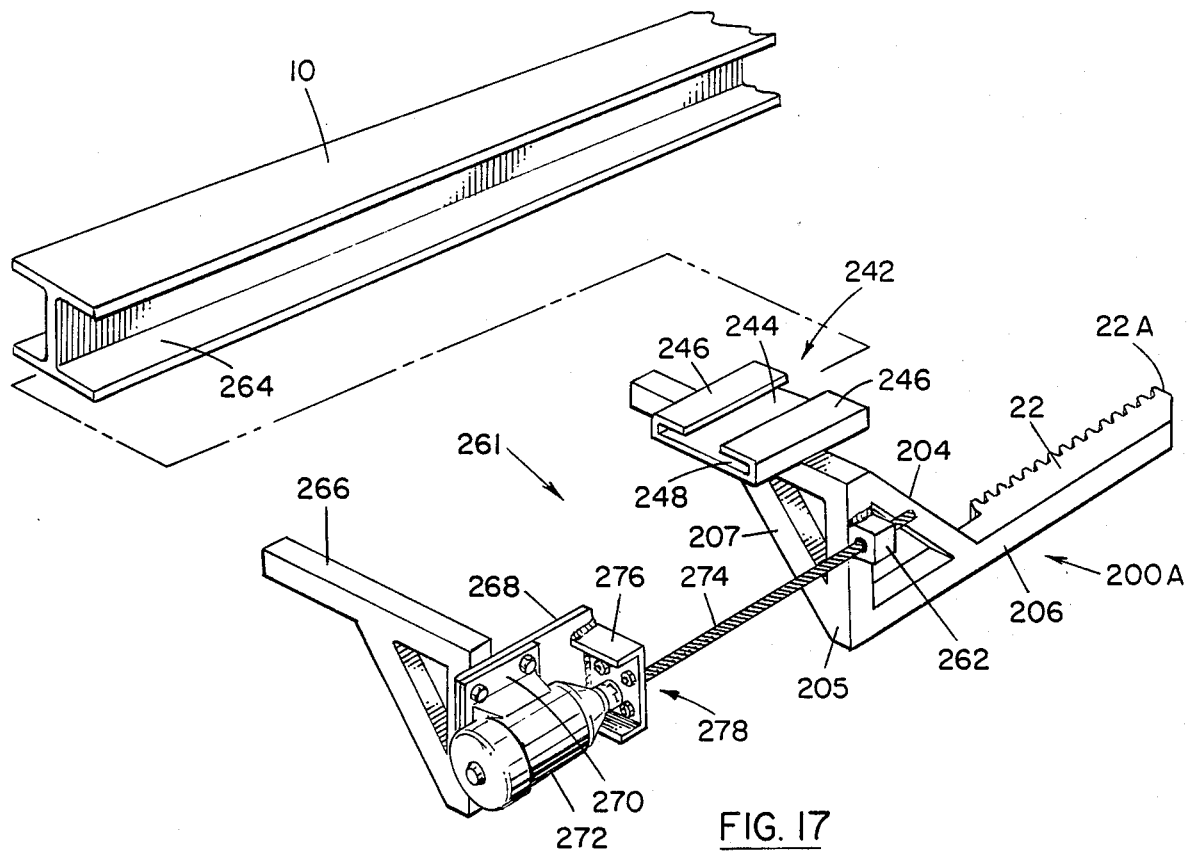
FIG. 17 is an exploded perspective view of an alternate means for adjustability of the modified rack gear assembly.
Figure 18:
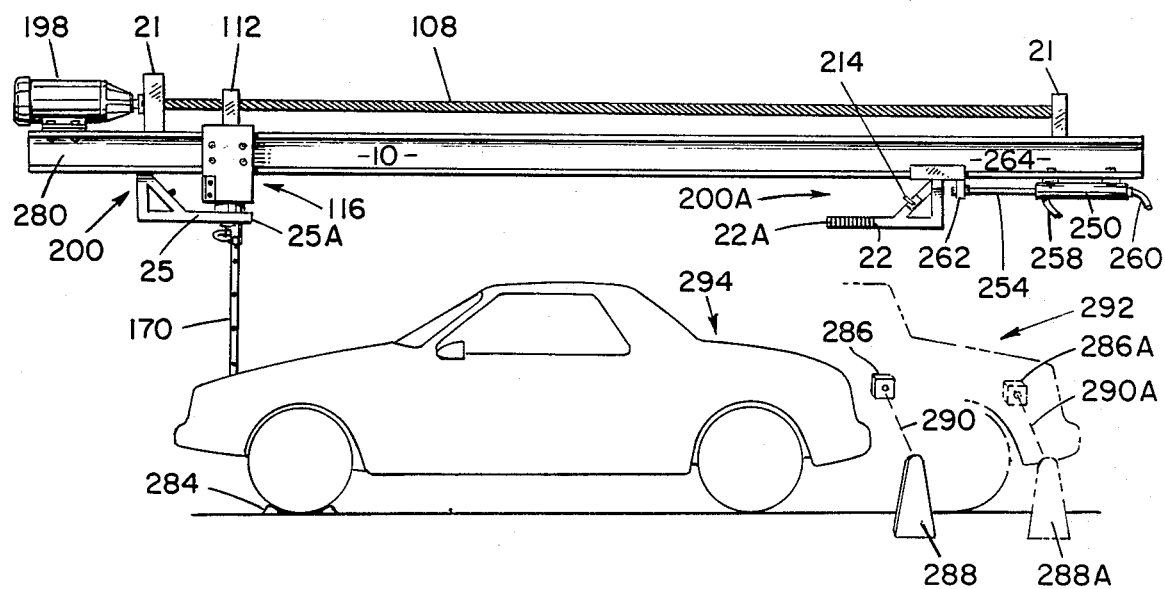
FIG. 18 is a side elevation of the entire assembly mounted over a vehicle and including the adjustable modified gear rack assembly and means for adjustment along with the sensors which cause it to change position.

Another means for moving the operating position of gear rack assembly 200A near the non-motor end of the I beam 10 is illustrated in FIG. 17 generally designated by numeral 261. In FIG. 17 the modified gear rack assembly 200A of FIG. 15 includes a threaded nut member 262 fixed for example to vertical member 205. L-shaped bracket 266 may be mounted on the I beam 10 at or near the non-motor end identified with reference numeral 264. Fixed to bracket 266 is base plate 268; motor mount 270 and step type electric motor 272 having computer control. A threaded drive screw 274 is connected to and is rotated by motor 272. Drive screw 274 is longitudinal of the I beam 10 and is threadedly connected to drive nut 262. Drive screw 274 may also be supported at the motor end by bracket 276 fixed to plate 268 and having a suitable bearing mounted thereon, indicated as bearing 278 (hidden). The position shown in FIG. 17 is with assembly 200A in extended position farthest away from step drive motor 272. With bracket 266 fixed at the lower flange of I beam end 264 and slide member 242 slid over the lower flange of I beam 10, assembly 200A would be closest to another gear rack assembly 200 fixed near the opposite motor end as indicated in FIG. 18.

The step type motor 272 is conventional, one use being in drive mechanisms for movement of satellite dish receptors. As applied here it would have a normal or start position which is visualized by rotation of the screw 274 in FIG. 17 until nut member 262 is drawn up adjacent to bearing 278 and bracket 276, with the unit shown in FIG. 17 assembled in operational position on I beam 10. In the normal or start position referred to, the non-motor end gear rack assembly 200A referred to here will be farthest away from motor end gear rack assembly 200.

The step type motor has the capability of turning a fixed number of rotations under influence of a computer control which may include a revolution counter. An intermediate first position is obtained by rotating the drive screw 274 via controlled step motor 272, half the number of revolutions necessary to carry the nut member 262 from the extended position shown in FIG. 17 toward the normal or start position, or vice versa halfway between the normal or start position and the extended position, towards the opposite end of I beam 10. Appropriately located limit switches connected in the drive motor control circuit can also be used to accomplish the purpose of stopping the drive motor 272 at an intermediate first position.

It can be recognized that by similar means, several intermediate positions of gear rack assembly 200A, if desired, can be controllably obtained between the normal position and the extended position in response to one or more control signals.

Other means for moving gear assembly 200A between an extended position as indicated by its position in FIG. 17 and a normal or start position adjacent end 264 (farthest away from the opposite gear rack assembly) in response to a control would include mounting an electric motor on bracket 266, the motor having a drive output shaft transverse to the sliding travel direction of assembly 200A on I beam 10 with a sprocket and endless chain running back to an idler sprocket suitably mounted from the I beam out beyond assembly 200A.

The assembly 200A would be connected by a suitable coupling to the upper strand of the endless chain intermediate the motor drive sprocket and the idler sprocket so that movement of the chain would draw assembly 200A back and forth between the motor drive sprocket and the idler sprocket. Suitably placed limit switches triggered by movement of assembly 200A would cause assembly 200A to locate at the extended position, the normal position or one or more intermediate positions therebetween in response to control signals from one or more electric eyes or other vehicle indicating position means indicated in FIG. 18.

In FIG. 18 a side view of the third embodiment is shown having the movable gear rack assembly 200A and the means for position adjustment of FIGS. 15 and 16, located adjacent the non-motor end 264 of I beam 10. The I beam 10 will be securely suspended centered in a car wash bay by suitable supports omitted for clarity. Seen mounted on the top flange of I beam 10 are main drive motor 198, bearing mount 21, screw gear bearing support 112 containing plastic drive nut 110, vibrationless screw gear 108 and at its outboard extreme end, another bearing support 21. Attached to screw gear bearing support 112 is reversible trolley 116 mounted for linear movement on I beam 10. At the main motor end 280 of I beam 10 is modified gear rack assembly 200. Gear rack assembly 200 is mounted offset from I beam 10 in the position indicated in FIG. 13 and gear rack assembly 200A is similarly mounted offset on the other side of I beam 10, assemblies 200, 200A having gear racks 25, 22 with ends 25A, 22A being the turn initiating beginning of a designated turning area at either end of I beam 10.

A vehicle 292 or 294 in outline is seen in FIG. 18 under the car wash assembly with its front wheel resting on a trundle 284. As is usual in car washes, trundle 284 has a switch or other electrical device which senses the presence of a vehicle in proper position and by means of red and green lights indicates if the vehicle is properly located and once it is, starts the washing sequence.

The third embodiment of the invention further includes an electric eye 286 and an electric eye sensing element 288 which has a beam 290. The electric eye elements are located on either side of a vehicle to be washed at a position above the floor so as to necessarily cause beam 290 to strike the entire side of any vehicle passing under the wash assembly. Dotted outline 292 represents the rear portion of a conventional or target sized vehicle positioned for operation of the wash with its front wheel in the trundle 284. The solid car outline 294 represents a small car 294 as compared to the conventional car 292.

FIG. 18 shows that when conventional sized car 292 is in washing position, beam 290 is interrupted. This signals a servomechanism to supply pressurized air to air line 258 which causes the piston in cylinder 250 to move, retracting operating rod 254 inside cylinder 250 and pulling the entire gear rack assembly 200A from its fully extended position shown, to a normal or start position The slide member 242 slides to the right towards end 264 of I beam 10 until the cylinder is fully retracted, wherein the gear racks 200, 200A are as far apart as they can ever get. The wash cycle is then activated and once that happens no further movement of the gear racks is permitted.

If instead of conventional vehicle 292, a small vehicle 294 enters to be washed, it is seen that because the vehicle is entirely forward of the electric eye beam 290, beam 290 is not interrupted. In that case a signal is sent to a servomechanism to supply pressurized air to air line 260 (in either case the non-pressure line is vented) so that the piston in cylinder 250 moves, driving operating rod 254 back out of the cylinder to its fully extended position. Because operating rod 254 is fixed to gear rack assembly 200A, assembly 200A on slide 242 moves toward the motor end of I beam 10 to define the minimum linear travel distance between designated turning zones. In this manner, when spur gear 164 engages gear rack 22 it makes manifold 170 turn close to the rear portion of a vehicle positioned for washing by adjustment of the position of gear rack 200A on I beam 10 depending upon whether the sensed vehicle is small or large.

Another electric eye 286A and sensing element 288A producing electric eye beam 290A can be located behind electric eye 286 farther from trundle 284 in order to accommodate three or more different vehicle lengths. In this arrangement a mechanism such as shown in FIG. 17 would be mounted on I beam 10 near end 264. This mechanism has at least a fully extended position, an intermediate position and a normal or start position at which slide 242 and assembly 200A are positioned farthest away from assembly 200.

If vehicle 294 is positioned for wash, neither beam 290 nor beam 290A is interrupted and the adjustment mechanism, such as mechanism 261 is activated to position assembly 200A at the extended position exemplified in FIGS. 17 and 18. If larger vehicle 292 is positioned for wash, both beam 290 and beam 290A are interrupted and mechanism 261 is activated to move assembly 200A to the fully opened normal start position farthest away from assembly 200. Then if a vehicle intermediate in length between small vehicle 294 and large vehicle 292 is positioned for wash, beam 290 is interrupted but beam 290A is not interrupted. This causes the control circuit between the electric eyes and mechanism 261 to signal mechanism 261 to position assembly 200A halfway (for example) between the fully extended position and the normal or start position where it remains until the wash cycle ends.

The positioning of the electric eyes and amount of extension of assembly 200A is selected to accommodate the size range of vehicles expected to be encountered and to make sure there will be clearance for boom 170 when it makes its turn around the rear of a positioned vehicle. Washing efficiency is enhanced because the spray from manifold 170 is close to the rear of a positioned vehicle thanks to the variable positioning of the gear rack turning mechanism 200A responsive to signals from the electric eyes dependent upon different vehicle lengths. It is contemplated that the number of vehicle sensing elements can be varied to position gear rack assembly 200A at a desired number of locations along I beam 10 and that other kinds of vehicle sensing elements, such as sonic sensors, could be employed to accomplish the same result.

Figure 19:
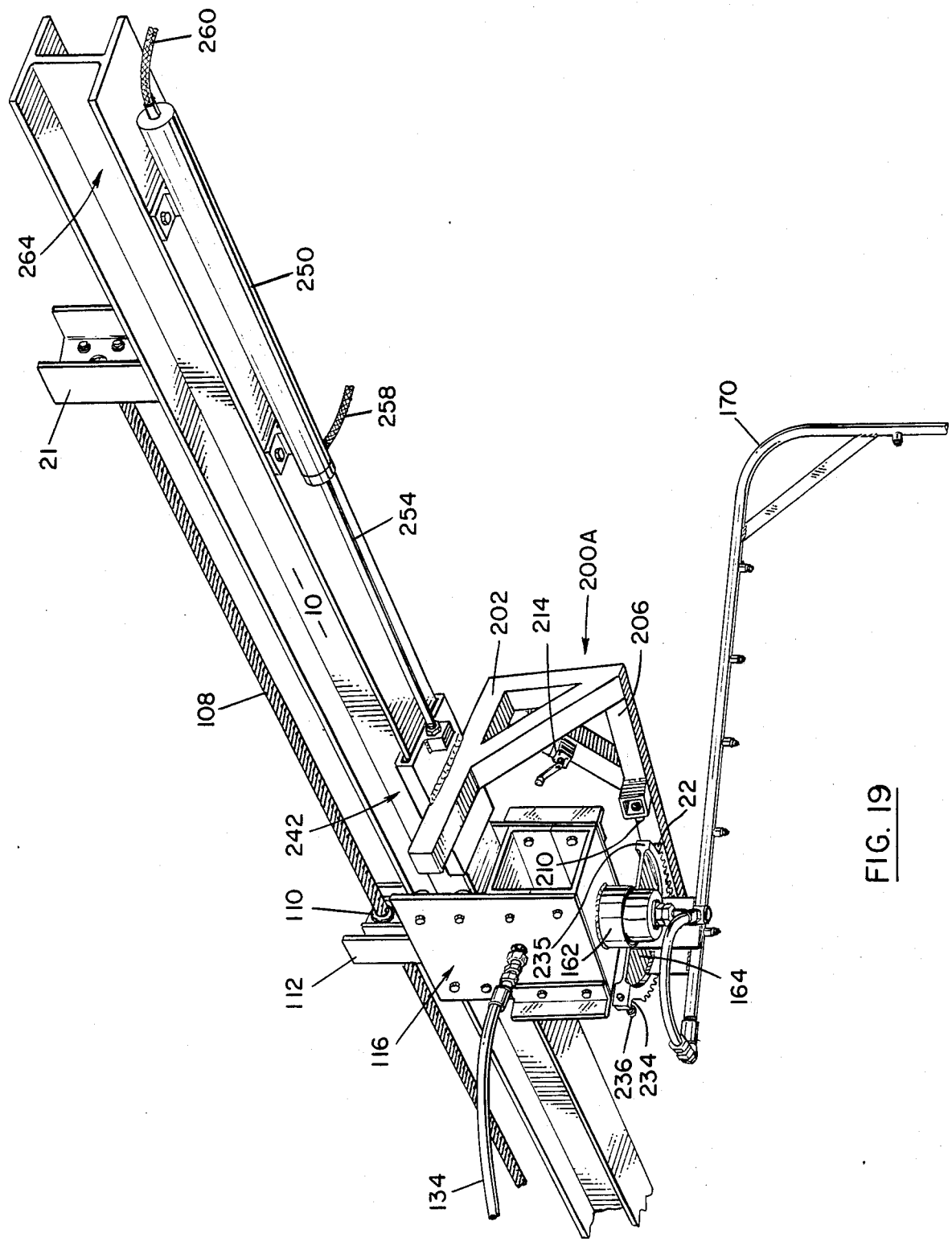
FIG. 19 is a perspective view of the modified rack gear assembly and adjusting means of the non-motor end of the track at the right side of FIG. 18 with the trolley having almost completed an end turn.

FIG. 19 is an enlarged view of the adjustable means for turning designated generally by the reference numeral 201 in FIGS. 15 and 16 and shown assembled in FIG. 18. In FIG. 19 air cylinder 250 is shown as the adjustment means but other means for adjusting could be employed. Here it is seen that water inlet 134 which supplies pressurized spraying fluid to the trolley 116 is a flexible hose to accommodate the back and forth movement of the trolley along the track. FIG. 19 illustrates an almost completed end turn with gear rack assembly 200A in the fully extended position as it would be for a shorter than conventional car.

An important aspect of the turning operation is exemplified by reference to FIG. 13 where another limit switch 217 is seen mounted on I beam 10 at about the beginning of designated turn area 25A. A similar limit switch on the opposite end of the I beam is located at the beginning of the opposite designated turn area 22A. Limit switch 217 may be triggered by the casters or some other portion of the approaching trolley in FIG. 13. Before the turn the trolley would approach switch 217 coming from the opposite non-motor end and moving towards the motor end with the teeth 80 of the spur gear 164 leading and the water boom manifold 180 degrees from the position shown in FIG. 13. Switch 217 is triggered slightly before bumper 236 comes in contact with terminal end 25A of gear rack 25. This reduces the main drive motor speed to about half the normal speed it runs in order to slow down the angular velocity of the spray arm 170 while the turn is being made.

Still referring to FIG. 13, as the trolley continues to move at reduced speed bumper 236 then contacts 25A to begin the engagement of the gear teeth 80 which correspond to similar teeth 80 on each of the gear racks. The trolley continues moving towards the motor end while the spur gear continues to rotate as subsequent teeth become engaged and previously engaged teeth become disengaged. Just as the last turn is completed the last tooth becomes disengaged, the trolley triggers limit switch 214 as the other edge 235 of the spur gear opposite the engaging end comes to rest against bumper 210. At this point the motor is reversed back to full speed moving the trolley towards the opposite end of the I beam track where bumper 236 will come in contact with end 22A at the beginning of a designated turning area and move to the end of a designated turning area defined as the position shown in FIG. 13 where the turn is completed.

Returning to FIG. 19 it is noted that limit switch 214 is mounted on modified gear rack apparatus 200A connected to the means for adjustment, which in this case is shown as an air cylinder. Note that in this case the limit switch 217 would be mounted near the end of arm 206 so as to be triggered by the approach of the trolley. It would be mounted in the vicinity of end 22A of gear rack 22 but is hidden from view. Because both limit switch 217, which slows down the motor to permit a smooth even end turn, and limit switch 214 which reverses the motor to drive the trolley in the opposite direction after each end turn are both mounted on assembly 200A, it does not matter where the position of assembly 200A is located along the I beam in response to the means for adjustment. If the trolley is visualized as approaching modified spur gear assembly 200A in FIG. 19, it will be seen that trolley 116 will have triggered a limit switch 217 slightly before bumper 236 came in contact with the terminal end 22A of rack gear 22 whereby the turn is initiated.

FIG. 19 shows the turn almost complete with the teeth of the spur gear and the gear rack about to disengage while the trolley continues to move towards the non-motor (second) end until the trolley triggers limit switch 214 and bumper 210 comes in contact with the opposite edge 235 of spur gear 164.

At this point the turn is completed and just as the main drive motor is reversed the position of the spur gear with respect to the gear rack is just like that shown in FIG. 13 except it is near gear rack 22 at the end of the track opposite the end shown in FIG. 13. Thanks to a gap 240 on spur gear 164, where some of the teeth are removed adjacent edge 235, a clearance is provided which allows linear travel in the opposite direction without further engagement between the spur gear and a given gear rack and without further rotation until the bumper 236 again reaches a designated turning area where the process is repeated. The spray arm always rotates in the counterclockwise direction at each end turn and travels oriented transversely to the I beam track between turns. Because the designated turn area is defined by the assembly 200A (at the non-motor end) it changes position along with the adjustable means for turning, assembly 200A. The same turn is made at assembly 200A in each case except that in the extended position shown for example in FIG. 19 the turn is made closer to the opposite comparable gear rack assembly 200. The assembly may be programmed for a desired number of cycles by conventional means. The beginning and ending position for the wash cycle is preferably that indicated in FIG. 18.

The third embodiment described herein is an improvement over the previous embodiments and is the most preferred embodiment. A particular improvement is in the automatic adjustment of the location where the end turn occurs with respect to the rear end of vehicles of different lengths, so that the spray manifold remains close to the vehicle surfaces for optimum washing action.

A vibration problem is solved in the third embodiment by use of a special screw gear 108 and plastic drive nut 110 along with a greater gear ratio in the gear reducer for the main drive motor 198, which like the other main drive motors disclosed, is a reversible variable speed electric motor having a running speed and a reduced turning speed, both preferably variable in the best mode.

The first embodiment and second modified embodiment employed a standard screw gear 4 with standard ball nut 7. The screw gear was about 1½ inches diameter with one inch travel of the ball nut per revolution and had two start threads wound along its length. With a main motor speed of about 2100 revolutions per minute (rpm) and a seven to one gear reducer the screw gear rotated at 300 rpm to move the trolley at about 300 inches/minute. Various undesirable harmonic vibrations occurred at different locations of the trolley along the screw gear.

The third embodiment has a specially built ¾ inch diameter stainless steel screw gear 108 which has twenty-four start threads wound around its length and produces three inches of travel of the plastic drive nut 110 (having corresponding engaging threads) for each revolution of the screw gear 108. In order to produce a trolley running speed of 300 inches per minute the screw gear turns at only 100 rpm at running speed. A greater speed reduction ratio of eleven to one enables the main drive motor to run at somewhat higher speed (less than full speed) to maintain torque. This, together with the close fitting plastic drive nut, produces a smooth vibrationless drive system for the trolley.

In the best mode the plastic drive nut is made by injection molding into the aluminum sleeve from an injection moldable mainly polyacetyl type plastic (Tradename POLYACETEL) with suitable fillers and internal lubricant materials. It should be compounded for strength, toughness, wear resistance, low friction and self lubricating characteristics. In operation it doesn't require oiling or greasing and eliminates pitting and rusting while running positively and smoothly on the screw gear without play between the threads. A threaded bronze drive nut could also be used.

Additionally the third embodiment includes an improved support structure for the spur gear and water boom manifold which is simpler and more rigid. The one-way clutch bearing 152 replaces the rotatable collar 34B and flange bearing 35 and eliminates the need for any gravity locks. A central cup like member supports the spur gear on the one-way clutch bearing. All rotating members are located below the trolley for accessibility and the water boom is securely fixed to the spur gear without the need for a counterbalance which adds weight. The clutch bearing is of the type revealed in U.S. Pat. No. 3,542,442 made by Morse Industrial Corporation, Ithica, NY and supplied Morse Industrial Corp., Box 728, 7120 Buffington, Florence, KY 41042.

Although the mechanical apparatus described is perhaps best suited for a car washing operation, it might also be applied, with appropriate modification of hoses, etc., to the spraying of solvents or paints where it is desired to have linear movement of the spraying mechanism along first one side of an object to be sprayed and then the other side of an object to be sprayed interspersed with end cycle turns of the spraying mechanism around the ends of the object to be sprayed. The length of the I beam between designated turn areas can be adjusted to accommodate a greater or lesser amount of linear spray travel before end cycle turns are initiated.

A particular advantage of the invention is the utter simplicity and positive operation of the mechanical components which minimizes the number and complexity of parts required that greatly contributes to inexpensive construction and operation. There are no belts or pulleys to slip and no chains to break. The spur gear and gear racks which interact to produce the end cycle turning operation are rugged, positive and long-wearing. The trolley is solidly mounted on a single straight economical I beam and moves only in a linear fashion back and forth along the I beam in response to a positive screw drive with a very low friction component rolling on simple casters in contact with the flanges of the I beam. There is no expensive oval-shaped track to build or maintain as is most often the case in the conventional apparatus of this type. Since only linear motion is involved, the hoses connecting the moving trolley are shorter and less subject to wear caused by flexing and bending than if the trolley carrying the spray boom has to follow a large oval track in order to go all the way around a vehicle.

Those skilled in the art will also appreciate the various modifications that may be made to the present invention as described herein without departing from the scope and spirit of the invention as recited in the inpended claims.

What I claim is:

1. An automatic washing apparatus comprising a suspended straight track and a housing mounted for travel upon said track including means for driving said housing up and down said track, wherein said housing carries a rotatable element with means for 180° degree rotation fixed thereon, including means for disengagement from cooperating means for initiating 180° degree rotation; and cooperating means for initiating 180° degree rotation mounted alongside the track at a designated turning area, the means for 180° degree rotation being engageable with said cooperating means for initiating 180° degree rotation upon travel of the housing to the designated turning area, said engagement causing substantially 180° degree rotation of the rotatable element, whereupon said means for disengagement causes separation of the means for 180° degree rotation and the cooperating means for initiating 180° degree rotation to permit unrestricted travel of the housing along the track.

2. The apparatus of claim 1 further comprising a locking device carried by the housing that holds said rotatable element in place during movement down said track.

3. In an automatic car washing apparatus the combination of a fixed straight track having a trolley housing movable by a reversible means for driving back and forth along the track between one end of the track and the opposite other end of the track, a rotatable water boom manifold carried by said trolley having a liquid inlet and a plurality of means for spraying liquid in a desired direction toward a car when a car is positioned for washing, said rotatable water boom manifold having means for 180° degree rotation engageable with cooperating means for initiating rotation of said manifold, said cooperating means being located at a designated area near said one end of the track, to rotate said manifold from a position on one side of the track to a similar position on the other side of the track to complete one end cycle, said manifold being further 180° degree rotatable in the same rotational direction, by engagement of said means for 180° degree rotation with cooperating means for initiating 180° degree rotation located at a designated area near said opposite other end of said track, from a position on said other side of said track back to a similar position on said one side of said track to complete an opposite other end cycle, said means for 180° degree rotation also having means for disengagement from rotation operable to disengage said means for 180° degree rotation from said cooperating means after each end cycle is complete and to allow linear travel between said designated areas.

4. The apparatus of claim 3 wherein said means for 180° degree rotation of said manifold is a spur gear fixed to said manifold and said cooperating means for initiating 180° degree rotation is a gear rack located at each designated area to cause said rotation.

5. The apparatus of claim 4 which further includes a cooperative fixed turn support bracket defining the end of each designated turning area which contacts a portion of said spur gear to help complete positive rotation of said manifold after said spur gear becomes free from said gear rack upon further continued advancement of said trolley toward any one end of said track.

6. The apparatus of claim 5 wherein the means for disengagement from rotation is a cut away part of the spur gear, cut away to allow clearance between the spur gear and cooperating gear rack after the completion of each end cycle allowing linear movement of the trolley without interference toward the opposite designated area.

7. The apparatus of claims 3, 4, 5 or 6 further including a means for locking connected to the trolley which interacts with the means for rotation by locking after each rotation to prevent counterrotation during travel between said designated areas.

8. An improved spraying apparatus of the type having an extended spray manifold connected to a source of spray, having inwardly directed spray nozzles, and being of the type which moves linearly along opposite sides of an object to be sprayed, turning around each opposite end of said object in the same rotational direction to spray all sides of the object in a spray cycle, said improvement comprising:

a fixed straight track having one end and an opposite end with a designated turning area near each end;

a trolley housing movably mounted on the track and driven for linear movement therealong by a reversible means for driving;

a spray manifold extended away from said housing but mounted for rotation thereon, having mechanical means for 180° degree rotation, said manifold having nozzles for spraying an object to be sprayed;

a mechanical means for activating said means for 180° degree rotation by engagement therewith, located at the beginning of the designated turning area at either end of the track, to initiate rotation when the housing is driven along the track to a given designated turning area, said mechanical means for rotation being disengaged from further rotation caused by said mechanical means for activation, by a means for disengagement, after turning 180° degrees around one end of an object to be sprayed, to complete one end cycle; and a means for reversing the drive means at either end of the track after 180° degrees rotation of the mechanical means for rotation and its attached spray manifold, said drive means being operated to move the housing in the opposite direction along the track to an opposite designated turning area, to complete another end cycle around the opposite other end of the object to be sprayed, said apparatus being powered for one or more complete spray cycles.

9. The assembly of claim 8 wherein the means for 180 degree rotation is a spur gear fixed to said manifold at its center of rotation, said spur gear having an alignment tooth at one extremity of a diametrical edge and having a plurality of gear rack engageable teeth.

10. The assembly of claim 9 wherein the means for activating the means for rotation are a pair of straight gear racks, one located to cooperate with the spur gear at a designated turn area near each end of said track, said gear racks being oppositely located on either side of opposite ends of said track and offset from it and being capable of causing 180 degree rotation of said spur gear when said spur gear alignment tooth contacts one end of one said gear rack while the trolley is moving toward any one end of said track, said rotation being completed when the diametrical edge of the spur gear contacts a turn support bracket fixed adjacent the opposite end of one of each of said gear racks, said trolley then being ready for travel along the track in the opposite direction.

11. The assembly of claim 10 wherein the means for disengagement is an untoothed gap area on said spur gear adjacent the opposite diametrical edge of said spur gear, being around the circumference of the gear after the gear engaging teeth, said gap being on the other side of the spur gear from the spur gear alignment tooth, said gap area providing a clearance between the spur gear and either of the gear racks after a 180 degree turn is completed so that reverse movement of the trolley along the track toward an opposite designated turn area can be accomplished without further rotation of said spur gear and the attached manifold.

12. The assembly of claims 8, 9, 10 or 11 further including at least one means for locking which can prevent counter-rotation of the spur gear after completion of any end cycle.

13. The assembly of claims 8, 9, 10 or 11 wherein the reversible means for driving comprises a reversible motor and gear reducer which turn a screw gear having a ball nut and flange thereon which is fixed to the trolley housing to move the trolley back and forth along the track.

14. In an automatic car washing assembly, the combination of a straight track suspended over a place for positioning an object to be washed, a trolley mounted for linear movement along the track, including a means for reversibly driving said trolley along said track, said track having a designated turning area near each opposite end of said track defined by the location of an offset gear rack and turn support bracket mounted offset at the side of said track, one mounted from said track at opposite sides of the track near each end of said track, said trolley having a water inlet connection including a high pressure water swivel in liquid communication with a boom manifold having a plurality of spray nozzles hanging from said trolley and rotatably supported thereon, said boom manifold having fixed thereon and rotatable with it, a spur gear with gear rack engaging teeth oriented to cooperate with one of said gear racks when moving toward one of them, said spur gear having a diametrical edge with an alignment bracket radially located near the diametrical edge to contact the end of one of said gear racks at the beginning of a designated turn area when moved toward a designated turn area in the direction of one of the opposite ends of said track, said spur gear being rotatable by cooperation between the gear rack teeth and gear rack engaging teeth of the spur gear to rotate said boom manifold in an end cycle through most of a 180 degree rotation resulting from continued linear movement of the trolley while said teeth are engaged, said spur gear also having on the side opposite the side having the alignment bracket a cut away untoothed gap located just after a last of gear engaging teeth, which on further movement of said trolley comes free of the gear rack, a portion of the diametrical edge of said spur gear generally opposite from that part of the diametrical edge having the alignment bracket is then positionable to complete the 180 degree rotation by contact with turn support brackets located just beyond each one of the gear racks at the end of each designated turn area, said assembly having means for reversing direction of travel of the trolley just after a 180 degree turn is completed causing the means for driving to move the trolley toward the opposite designated turn area where the turning process can be repeated, said cut away untoothed gap on said spur gear being undercut sufficiently to clear the gear rack during reverse movement of the trolley toward the opposite end of track, said trolley also having mounted thereon one or more means for locking which can lock by engaging a portion of the spur gear and preventing counter-rotation of the spur gear and manifold after completion of an end cycle turn, said apparatus further being controllable to move the trolley back and forth along the track for the desired number of wash cycles.

15. An assembly for moving a traveling housing mounted arm in a repeatable cycle about a fixed track when powered, the arms moving along alternate sides and turning in the same rotational direction around opposite ends of the track on which the housing travels;

comprising, the combination of a straight track with a first end and a second end, having a movable housing mounted thereon for travel along the length of said track; a means for driving connected to said housing for reversibly driving said housing between the first and second ends of the track; a rotatable arm carried by the housing, having means for rotating attached thereto, the arm being supported by the housing in a direction generally normal to the line of travel of the housing between designated turn zones near each end of the track; a cooperating first means for initiating a half circle rotation of the arm by contact with the means for rotation, said first means being located at the designated turn zone adjacent the first end of the track; a cooperating second means for initiating half circle rotation of the arm by contact with the means for rotation, said second means being located at the designated turn zone adjacent the second end of the track, said second means for initiating half circle rotation being on the opposite side of said track from said first means for initiating half circle rotation, and; a means for reversing the means for driving to change the direction of travel of the housing after any given half circle rotation of the arm is completed, wherein the arm is carried by the housing along one side of the track when moving toward the first end of the track and then along with the other side of the track after a half circle rotation when the housing is traveling toward the second end of the track, the means for rotation and means for initiating half circle half circle rotation becoming disengaged once a half circle turn is nearly complete.

16. The assembly of claim 15 wherein said means for rotating said arm is a partial half spur gear mounted to rotate with said arm.

17. The assembly of claim 16 wherein said first and second means for initiating half circle rotation are gear racks supported by the assembly at the respective designated turn zones, one offset from the track adjacent the first end of the track and the other offset from the track adjacent the second end of the track, each located on opposite sides of the track; each of said gear racks cooperating with the partial half spur gear at respective opposite ends of said track to rotate said arm, until each half circle turn is nearly completed, whereupon the partial half spur gear disengages from the gear rack and upon reversal of the drive means, the housing is free to move in the opposite direction.

18. The assembly of claim 17 which further includes a cooperative fixed turn support bracket supported by the assembly and defining the end of each designated turn zone, which contacts a portion of said spur gear to help complete positive rotation of said arm near the end of each turn when said spur gear becomes disengaged from said gear rack.

19. The assembly of claim 17, further including means for locking and unlocking, one on each side of and supported by the housing, which interact with the means for rotation of the arm by alternatively locking after each turn to prevent counterrotation of the arm during linear travel of the housing along the track.

20. An automatic car wash apparatus in operable assembly comprising:
a straight track having a means for turning located near each end of the track, one of said means for turning being adjustable between at least a normal position and an extended position with respect to the other means for turning;
a movable trolley housing mounted for linear travel along the track, and reversible means for driving said trolley between ends of the track;
a spray arm with means for rotation, supported on the trolley housing;
the spray arm being rotatable through a first end turn by engagement of the means for rotation with one of said means for turning when the trolley is driven to near one end the means for rotation becoming disengaged from the one said means for rotation when said end turn is complete, the trolley being free to be driven to the near opposite other end of the track; and
the spray arm being rotatable in the same direction through a second end turn by engagement of the means for rotation with the other of said means for turning when the trolley is driven to near the other end, the means for rotation becoming disengaged from the other of said means for turning when said second end turn is complete and the trolley being free to travel back to near the opposite end, each end turn being repeatable alternately regardless of the position of the adjustable means for turning.

21. The automatic car wash apparatus of claim 20 further including a means for compensating for vehicles of different lengths which are positioned under the track for washing.

22. The automatic car wash of claim 21 wherein the means for compensating for vehicles of different lengths further includes a vehicle sensing element which is operable to sense the approximate length of a vehicle positioned under the track for washing and operate a means for moving the adjustable means for turning to at least a normal position for a vehicle of conventional length or to an extended position for a smaller than conventional vehicle.

23. The apparatus of claim 20, 21, or 22 wherein the means for rotation of the spray arm is a spur gear fixed to said spray arm having means for disengagement and the means for turning is a modified gear rack assembly having a rack gear which cooperates with said spur gear to cause end turn rotation of the spray arm during advancement of the trolley toward any one end of said track, a designated turn area being defined between the initial contact between the spur gear to initiate an end turn and the position of the spur gear after completion of an end turn.

24. An automatic car washing apparatus comprising:
a straight track to be supported over a vehicle to be washed, having a first motor end portion and an opposite second non-motor end;
a trolley housing mounted on the track for linear movement therealong, powered for linear movement by a reversible means for driving;
a rotatable spray assembly carried under the track supported by the trolley housing;
said rotatable assembly having a rotatable spray arm with a plurality of spray nozzles and a means for rotation of the spray arm and including a spray liquid inlet and passageway leading to the spray arm;
a means for turning fixed to the track adjacent its first end and positioned to cooperate with the means for rotation at a first designated turning area to initiate and complete an end turn by engagement with the means for rotation and disengagement therefrom as the end turn is completed;

means for reversing the trolley drive means at the completion of each end turn;

an adjustable means for turning moveably mounted adjacent the second end of the track, adjustable to at least a normal position and an extended position by operation of a positioning device on the track responsive to a signal from a vehicle location indicator which positions the means for turning at the normal position when a large vehicle is sensed and positions the means for turning at an extended position when a smaller vehicle is sensed; and the adjustable means for turning cooperating with the means for rotation at a second designated turning area, which changes position along with the adjustable means for turning to initiate and complete an end turn by engagement with the means for rotation and disengagement therefrom as the end turn is completed.

25. The apparatus of claim 24 wherein the means for rotation is a spur gear fixed to said spray arm above its center of rotation said spur gear having an extension with an adjustable bumper at one extremity of a diametrical edge and having a plurality of gear rack engageable teeth and clearance gap at the opposite extremity of the diametrical edge.

26. The apparatus of claim 25 wherein the means for turning and the adjustable means for turning are a pair of gear rack assemblies each having a straight gear rack being oppositely located on either side of opposite ends of said track and offset from it and being capable of initiating and completing an end turn of the spray arm by contact of the spur gear bumper with one end of a gear rack while the trolley is moving toward any one end of said track, said end turn being completed when the diametrical edge of the spur gear contacts a bumper on a gear rack assembly adjacent the opposite end of each gear rack, said trolley their being ready for travel along the track in the opposite direction.

27. The apparatus of claims 20, 21, or 22 further including means for locking carried by the trolley, said means for locking preventing counter-rotation of the rotatable arm.

28. The apparatus of claims 24, 25 or 26 wherein said rotatable assembly further includes means for one-way rotation.

29. An improved turning mechanism for an automatic washing apparatus comprising a suspended straight track and a housing mounted for travel upon said track including means for driving said housing up and down said track, wherein the improvement provides said housing which carries a rotatable element with gear means fixed thereon, said gear means having toothed and untoothed portions, the toothed portion being engageable with cooperating gear means located at a designated turning area of the track to cause substantially 180° degree rotation of the rotatable element, the untoothed portion being positionable adjacent the cooperating gear means after said 180° degree rotation, disengaged therefrom, to permit unrestricted travel of the housing along the track.

30. The apparatus of claim 29 wherein the gear means is a spur gear fixed to the rotatable element and the cooperating gear means is a gear rack having teeth complementary to mesh with the toothed portion of the spur gear.

31. The apparatus of claim 29 which further includes a cooperative fixed turn support bracket defining the end of the cooperating gear means which contacts a portion of the gear means to help complete positive rotation of the rotatable element after the gear means becomes disengaged from the cooperating gear means after substantially 180° degree rotation of the rotatable element.

32. The apparatus of claim 30 wherein the cooperative fixed turn support bracket defining the end of the designated turning area on the cooperating gear rack contacts a portion of said spur gear to help complete positive rotation of said rotatable element after said spur gear becomes free from said gear rack and disengaged therefrom.

33. The apparatus of claim 29 wherein the gear means is a half spur gear and the untoothed portion is a cut away part of the outer circumferential edge of the spur gear, cut away to allow clearance between the spur gear and the cooperating gear rack after the completion of substantially 180° rotation by engagement of the respective teeth.

34. The apparatus of any one of claims 29 through 33 further including a locking device that prevents counter-rotation of the rotatable element.

* * * * *